(12) United States Patent
Xue et al.

(10) Patent No.: US 11,896,175 B2
(45) Date of Patent: Feb. 13, 2024

(54) METHOD AND APPARATUS FOR UPDATING WORKING MAP OF MOBILE ROBOT, AND STORAGE MEDIUM

(71) Applicant: HUAWEI TECHNOLOGIES CO., LTD., Shenzhen (CN)

(72) Inventors: Jingtao Xue, Beijing (CN); Yanong He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 17/565,640

(22) Filed: Dec. 30, 2021

(65) Prior Publication Data

US 2022/0117456 A1    Apr. 21, 2022

Related U.S. Application Data

(63) Continuation of application No. PCT/CN2020/085231, filed on Apr. 17, 2020.

(30) Foreign Application Priority Data

Jul. 2, 2019    (CN) .......................... 201910588829.0

(51) Int. Cl.
*A47L 11/40* (2006.01)
*G05D 1/02* (2020.01)

(52) U.S. Cl.
CPC ........ *A47L 11/4011* (2013.01); *G05D 1/0219* (2013.01); *G05D 1/0274* (2013.01); *A47L 2201/04* (2013.01); *G05D 2201/0203* (2013.01)

(58) Field of Classification Search
CPC ............. A47L 11/4011; A47L 2201/04; G05D 1/0219; G05D 1/0274; G05D 2201/0203;
(Continued)

(56) References Cited

U.S. PATENT DOCUMENTS 9,612,123 B1    4/2017  Levinson et al.
9,939,814 B1    4/2018  Bauer et al.
(Continued)

FOREIGN PATENT DOCUMENTS

CN    101975951 A    2/2011
CN    103424112 A    12/2013
(Continued)

*Primary Examiner* — Bhavesh V Amin
(74) *Attorney, Agent, or Firm* — Rimon PC

(57) ABSTRACT

This application provides a method and an apparatus for updating a working map of a mobile robot, and a storage medium in the field of intelligent control technologies. The method includes: determining a plurality of detected environment maps based on object distribution information detected by the mobile robot in a moving process; merging the plurality of detected environment maps to obtain a merged environment map; and then performing weighting processing on the merged environment map and an environment layout map currently stored in the mobile robot, to obtain an updated environment layout map. The environment layout map stored in the mobile robot is updated by using the plurality of detected maps obtained by the mobile robot during working, so that the updated environment layout map can reflect a more detailed environment layout. This helps the mobile robot subsequently better execute a working task.

13 Claims, 12 Drawing Sheets

(58) Field of Classification Search
CPC .............. G01C 21/383; G01C 21/3837; G01C 21/3848; G01C 21/387; G01C 21/32; G06V 10/809; G06V 20/10; G06V 20/653
See application file for complete search history.

(56) References Cited

U.S. PATENT DOCUMENTS

| | | |
|---|---|---|
| 2005/0182518 A1 | 8/2005 | Karlsson |
| 2017/0197311 A1 | 7/2017 | Garcia et al. |
| 2018/0149487 A1 | 5/2018 | Lee et al. |
| 2018/0281191 A1 | 10/2018 | Sinyavskiy et al. |
| 2018/0322646 A1 | 11/2018 | Matthies et al. |

FOREIGN PATENT DOCUMENTS

| | | |
|---|---|---|
| CN | 103645480 A | 3/2014 |
| CN | 105652864 A | 6/2016 |
| CN | 107390681 A | 11/2017 |
| CN | 108446710 A | 8/2018 |
| CN | 108759844 A | 11/2018 |
| CN | 109192054 A | 1/2019 |
| CN | 109764869 A | 5/2019 |
| WO | 2018074903 A1 | 4/2018 |

METHOD AND APPARATUS FOR UPDATING WORKING MAP OF MOBILE ROBOT, AND STORAGE MEDIUM

CROSS-REFERENCE TO RELATED APPLICATIONS

This application is a continuation of International Application No. PCT/CN2020/085231, filed on Apr. 17, 2020, which claims priority to Chinese Patent Application No. 201910588829.0, filed on Jul. 2, 2019. The disclosures of the aforementioned applications are hereby incorporated by reference in their entireties.

TECHNICAL FIELD

This application relates to the field of intelligent control technologies, and more specifically, relates to a method and an apparatus for updating a working map of a mobile robot, and a storage medium.

BACKGROUND

With development of intelligent control technologies, mobile robots are increasingly applied. During working, a mobile robot usually obtains an environment layout map in a working environment through simultaneous localization and mapping (SLAM), and then plans a path based on the environment layout map during specific working, to execute a corresponding working task according to a corresponding path.

The mobile robot (especially a home service robot) usually uses a consumer-level sensor and drive system and has no external auxiliary localization device. Consequently, both localization accuracy and reliability are not high. Therefore, to reduce impact of a single localization anomaly of the mobile robot on path planning, the mobile robot usually does not store an environment layout map. Each time the mobile robot works, the mobile robot re-constructs an environment layout map, and then plans a path based on the newly constructed map (for example, each time the mobile robot starts to execute a task, the mobile robot first roughly detects an ambient environment, constructs an environment layout map based on detected object distribution information, and then plans a path based on the environment layout map).

The environment layout map obtained in the foregoing mapping manner is usually not comprehensive enough, and cannot reflect a detailed object layout in a workplace.

SUMMARY

This application provides a method and an apparatus for updating a working map of a mobile robot, and a storage medium, to obtain a map that can more comprehensively reflect a working environment layout of the mobile robot.

According to a first aspect, a method for updating a working map of a mobile robot is provided. The method includes: obtaining M detected environment maps; merging the M detected environment maps to obtain a merged environment map; and performing weighting processing on a pixel value of the merged environment map and a pixel value of an environment layout map to obtain an updated environment layout map.

The M detected environment maps are determined based on object distribution information detected by a mobile robot in a moving process, and M is an integer greater than 1.

In this application, the detected environment map may be determined based on the object distribution information detected by the mobile robot, and the environment layout map is usually obtained by merging a plurality of detected environment maps. Both the detected environment map and the environment layout map can reflect object distribution in a working environment. Compared with the detected environment map, the environment layout map usually can more comprehensively reflect overall object distribution or an overall object layout in the working environment.

When the M detected environment maps are merged (specifically, the M detected environment maps may be superposed) to obtain the merged environment map, the M detected environment maps may be directly merged; or the M detected environment maps may be merged after specific preprocessing (for example, filtering processing or noise reduction processing) is performed on the M detected environment maps; or specific selection may be performed on the M detected environment maps, and then selected detected environment maps are merged.

It should be understood that the environment layout map may be obtained by the mobile robot through merging based on a plurality of previously obtained detected environment maps.

Particularly, when executing a task in a new workplace, the mobile robot may first perform detection in the workplace, determine a plurality of detected environment maps based on detected object distribution information, and then determine an environment layout map based on the plurality of detected environment maps. Subsequently, the mobile robot may continuously update and optimize the environment layout map according to the method in this application.

Optionally, merging the M detected environment maps to obtain a merged environment map includes: performing filtering processing on the M detected environment maps to obtain M detected environment maps obtained after filtering processing; and merging the M detected environment maps obtained after filtering processing to obtain the merged environment map.

Filtering processing is performed on the detected environment map, so that interference of a small object in an environment can be removed, thereby providing a main layout of the environment.

When filtering processing is performed on the detected environment map, morphological filtering may be specifically used to extract a line feature of the detected environment map.

Optionally, the environment layout map is an environment layout map that is of a first workplace and that is currently stored in the mobile robot.

After completing updating of the environment layout map to obtain the updated environment layout map, the mobile robot may replace the original environment layout map, and store the updated environment layout map. Until next map update, the mobile robot re-updates the environment layout map based on a detected environment map that is detected.

In this application, the environment layout map stored in the mobile robot is updated by using a plurality of detected maps obtained by the mobile robot during working, so that the updated environment layout map can reflect a more detailed environment layout. This helps the mobile robot subsequently better execute a working task based on the updated environment layout map.

After completing updating of the environment layout map, the mobile robot may be controlled to execute a working task in the first place based on the updated environment layout map.

The updated environment layout map can better and comprehensively reflect object distribution in the first place. Therefore, the mobile robot can better execute a working task in the first place based on the updated environment layout map.

Optionally, M is a preset value.

M may be a value preset by a manufacturer, or may be a value preset by a user.

In addition to being preset, the value of M may be flexibly set by using detected environment map quantity configuration information, and a quantity of detected environment maps to be obtained can be directly determined by using the detected environment map quantity configuration information.

Optionally, before obtaining M detected environment maps, the method further includes: obtaining the detected environment map quantity configuration information, where the detected environment map quantity configuration information includes the value of M; and determining the value of M based on the detected environment map quantity configuration information.

M can be flexibly set by using the detected environment map quantity configuration information.

The detected environment map quantity configuration information may be information input by a user. For example, when the method is performed by a control apparatus, the user may input the detected environment map quantity configuration information through a control interface of the control apparatus. The control apparatus may be a module integrated into the mobile robot, or may be a separate device independent of the mobile robot.

In addition, the value of M may be adjusted by using the detected environment map quantity modification information, to increase or decrease the value of M. For example, the value of M may be adjusted by sending the detected environment map quantity modification information to the control apparatus.

With reference to the first aspect, in some implementations of the first aspect, when weighting processing is performed, a weight corresponding to a pixel value of the merged environment map is a first weight, and a weight corresponding to a pixel value of the environment layout map is a second weight. Values of the first weight and the second weight are determined based on a map update requirement of the mobile robot.

The map update requirement of the mobile robot may be a requirement of the mobile robot (during execution of a task) on a speed (or a frequency) of updating the environment layout map, or may be a requirement of the mobile robot (during execution of a task) on an amount of updating the environment layout map.

Generally, when the mobile robot requires to quickly update the environment layout map, the first weight may be set to a large value, and the second weight may be set to a small value. On the contrary, when the mobile robot does not require to quickly update the environment layout map, the first weight may be set to a small value, and the second weight may be set to a large value.

In addition, when the mobile robot requires a large amount of updating the environment layout map, the first weight may be set to a large value, and the second weight may be set to a small value. On the contrary, when the mobile robot requires a small amount of updating the environment layout map, the first weight may be set to a small value, and the second weight may be set to a large value.

In this application, because the first weight and the second weight are determined based on the map update requirement of the mobile robot, the environment layout map may be flexibly updated based on the map update requirement of the mobile robot.

With reference to the first aspect, in some implementations of the first aspect, determining that values of the first weight and the second weight based on a map update requirement of the mobile robot includes: the first weight is in a positive correlation with an environment layout map update frequency required by the mobile robot, and the second weight is in a negative correlation with the environment layout map update frequency required by the mobile robot.

To be specific, when the mobile robot (during execution of a task) requires a high map update frequency, the first weight may be set to a large value, and the second weight may be set to a small value (for example, the first weight value is set to 0.7, and the second weight value is set to 0.3). On the contrary, when the mobile robot (during execution of a task) requires a low map update frequency, the first weight may be set to a small value, and the second weight may be set to a large value (for example, the first weight value is set to 0.3, and the second weight value is set to 0.7).

With reference to the first aspect, in some implementations of the first aspect, determining that values of the first weight and the second weight based on a map update requirement of the mobile robot includes: the first weight is in a positive correlation with an environment layout map update amount required by the mobile robot, and the second weight is in a negative correlation with the environment layout map update amount required by the mobile robot.

With reference to the first aspect, in some implementations of the first aspect, merging the M detected environment maps to obtain a merged environment map includes: determining N detected environment maps from the M detected environment maps; and merging the N detected environment maps to obtain the merged environment map.

Consistency between any two of the N detected environment maps is greater than or equal to a first threshold, and N is a positive integer less than or equal to M.

Detected environment maps with better consistency are selected from the M detected environment maps and merged, so that a more accurate merged environment map can be obtained.

With reference to the first aspect, in some implementations of the first aspect, the method further includes: obtaining current object distribution information; determining a current detected environment map based on the current object distribution information; when consistency between the current detected environment map and the environment layout map is less than a second threshold, determining that the mobile robot is abnormally detecting an ambient environment; and controlling the mobile robot to recover from an anomaly.

The current object distribution information is object distribution information detected by the mobile robot in a preset interval or a preset distance, the preset interval is a time interval before the mobile robot reaches a current detection point, and the preset distance is a distance by which the mobile robot moves before the mobile robot reaches the current detection point.

The preset interval may be a time interval set by a person, and the preset distance may be a distance set by a person. The preset interval and the preset distance may be flexibly set based on a specific requirement.

That the mobile robot is abnormal when detecting the ambient environment may mean that the mobile robot cannot accurately detect object distribution information in a process of detecting the ambient environment due to a specific fault.

Specifically, the mobile robot may be unable to detect the accurate object distribution information due to a localization fault, a sensor fault, or faults of some processing modules inside the mobile robot.

With reference to the first aspect, in some implementations of the first aspect, controlling the mobile robot to recover from an anomaly includes: controlling the mobile robot to return from the current detection point to a first detection point, where a distance between the first detection point and the current detection point is the preset distance; and controlling the mobile robot to start to re-detect the ambient environment from the first detection point, to obtain new object distribution information.

In this application, when a difference between the current detected environment map and the environment layout map is large, new object distribution information is obtained by performing a return operation and re-starting to detect the ambient environment, so that the accuracy of the object distribution information obtained by the mobile robot can be ensured as far as possible.

Optionally, controlling the mobile robot to recover from an anomaly includes: controlling the mobile robot to reset an operating system.

Controlling the mobile robot to reset an operating system is equivalent to controlling the mobile robot to restart a system (similar to restarting a computer).

Optionally, controlling the mobile robot to recover from an anomaly includes: controlling the mobile robot to restart a sensor of the mobile robot.

Controlling the mobile robot to restart a sensor of the mobile robot may be specifically controlling the mobile robot to disable the sensor and then re-enable the sensor.

The sensor of the mobile robot may include a laser radar, an encoder, a gyroscope, an ultrasonic sensor, an infrared sensor, and the like.

With reference to the first aspect, in some implementations of the first aspect, the method further includes: controlling the mobile robot to clear the current object distribution information.

The mobile robot is controlled to clear the current object distribution information, so that obtained object distribution information that may not be accurate enough due to a localization anomaly or a sensor fault can be cleared, and accuracy of the object distribution information obtained by the mobile robot can be ensured as far as possible.

It should be understood that the operation of controlling the mobile robot to clear the current object distribution information may be considered as an additional operation other than anomaly recovery, or may be considered as a part of the anomaly recovery operation.

With reference to the first aspect, in some implementations of the first aspect, the M detected environment maps all are located in a same coordinate system.

When the M detected environment maps are maps located in a same coordinate system, the M detected environment maps can be more precisely merged to obtain a more accurate merged environment map.

With reference to the first aspect, in some implementations of the first aspect, the M detected environment maps all are maps located in a reference coordinate system, and an origin of the reference coordinate system may be at any one of the following locations: a location of a charging station of the mobile robot; a location at which the mobile robot stops after ending a task; or a location of a waste transfer station that goes with the mobile robot.

It should be understood that a central point of each of the foregoing locations (the location of the charging station, the location at which the mobile robot stops, and the location of the waste transfer station) or a point at another location (for example, a point at a specific location) can be used as the origin of the reference coordinate system.

Optionally, obtaining M detected environment maps includes: obtaining a first detected environment map in the M detected environment maps, where a coordinate value of a grid point in the first detected environment map is a coordinate value in a first coordinate system; and converting the coordinate value of the grid point in the first detected environment map into the coordinate value in the reference coordinate system.

The first detected environment map may be any of the M detected environment maps. The first detected environment map may be determined based on object distribution information detected when the mobile robot executes an $i^{th}$ ($1 \leq i \leq M$, and i is an integer) working task. An origin of the first coordinate system may be determined based on a start location at which the mobile robot executes the $i^{th}$ task.

Specifically, the coordinate origin of the first coordinate system may be a start point at which the mobile robot executes the $i^{th}$ task (for example, may be a central point of the start location at which the mobile robot executes the $i^{th}$ task).

With reference to the first aspect, in some implementations of the first aspect, the M detected environment maps are determined based on object distribution information detected when the mobile robot executes a working task in the first workplace.

In this application, the M detected environment maps are determined by using the object distribution information detected when the mobile robot executes a working task, so that the object distribution information can be obtained when the mobile robot executes another task, thereby improving working efficiency.

With reference to the first aspect, in some implementations of the first aspect, the M detected environment maps are respectively determined based on M pieces of object distribution information, and the M pieces of object distribution information are respectively object distribution information obtained by detecting the ambient environment when the mobile robot executes M working tasks in the first workplace.

Any one of the M detected environment maps is determined based on object distribution information detected when the mobile robot executes a corresponding working task.

In this application, each of the M detected environment maps is determined based on the object distribution information obtained when the mobile robot executes a working task in the first workplace, so that each detected environment map can comprehensively reflect object distribution in the first place as far as possible, and a finally obtained updated environment layout map can comprehensively reflect object distribution in the first place.

Optionally, obtaining M detected environment maps includes: obtaining the detected environment map based on the object distribution information obtained by detecting the ambient environment when the mobile robot executes a working task in the first workplace, until the M detected environment maps are obtained.

In this application, a quantity of obtained detected environment maps may be counted in real time. When the quantity of the detected environment maps reaches M, the merged environment map can be determined based on the M detected environment maps.

It should be understood that when the merged environment map is determined based on the M detected environment maps, the detected environment map may further continue to be obtained. When M detected environment maps are obtained again, the process in the method in the first aspect may be repeatedly performed.

Optionally, obtaining the detected environment map based on the object distribution information obtained by detecting the ambient environment when the mobile robot executes a working task in the first workplace, until the M detected environment maps are obtained includes: obtaining one detected environment map based on the object distribution information obtained by detecting the ambient environment when the mobile robot executes one working task in the first workplace, until the M detected environment maps are obtained.

According to a second aspect, a method for updating a working map of a mobile robot is provided. The method includes: obtaining M detected environment maps from a mobile robot; merging the M detected environment maps to obtain a merged environment map currently obtained through merging; obtaining, from the mobile robot, an environment layout map currently stored in the mobile robot; performing weighting processing on a pixel value of the merged environment map currently obtained through merging and a pixel value of the currently stored environment layout map to obtain an updated environment layout map; and sending the updated environment layout map to the mobile robot.

The M detected environment maps are determined based on object distribution information detected by a mobile robot in a moving process, and M is an integer greater than 1.

In addition, the currently stored environment layout map is obtained by performing weighting processing on a merged environment map obtained the last time through merging and an environment layout map stored the last time, and the merged environment map obtained through merging the last time is obtained through merging based on M detected environment maps obtained the last time.

The method in the second aspect may be performed by a control apparatus configured to control the mobile robot to work.

In this application, a plurality of detected maps obtained by the mobile robot during working are obtained from the mobile robot to update the environment layout map currently stored in the mobile robot, so that the updated environment layout map can reflect a more detailed environment layout. This helps the mobile robot subsequently better execute a working task based on the updated environment layout map.

Optionally, obtaining M detected environment maps from a mobile robot includes: receiving the M detected environment maps from the mobile robot.

It should be understood that in the process of obtaining the M detected environment maps, the M detected environment maps may be obtained from the mobile robot at one time (the mobile robot sends the M detected environment maps) after the mobile robot generates the M detected environment maps, or one detected environment map may be obtained from the mobile robot each time the mobile robot generates the detected environment map (the mobile robot sends one detected environment map each time generating the detected environment map).

With reference to the second aspect, in some implementations of the second aspect, before merging the M detected environment maps, the method further includes: determining whether the M detected environment maps are obtained.

Before the M detected environment maps are merged, a quantity of detected environment maps needs to be counted. After a quantity of obtained detected environment maps reaches M, the M detected environment maps are merged.

With reference to the second aspect, in some implementations of the second aspect, the method further includes: obtaining current object distribution information from the mobile robot; determining a current detected environment map based on the current object distribution information; when consistency between the current detected environment map and the currently stored environment layout map is less than a second threshold, determining that the mobile robot is abnormal when detecting an ambient environment; and sending an anomaly recovery instruction to the mobile robot.

The current object distribution information is object distribution information detected by the mobile robot in a preset interval or a preset distance, the preset interval is a time interval before the mobile robot reaches a current detection point, and the preset distance is a distance by which the mobile robot moves before the mobile robot reaches the current detection point.

The anomaly recovery instruction is used to instruct the mobile robot to recover from an anomaly. After receiving the anomaly recovery instruction, the mobile robot recovers from the anomaly in response to the anomaly recovery instruction.

With reference to the second aspect, in some implementations of the second aspect, recovering from an anomaly includes: sending a return instruction to the mobile robot; and sending a re-detection instruction to the mobile robot.

The return instruction is used to instruct the mobile robot to return from the current detection point to a first detection point, and a distance between the first detection point and the current detection point is the preset distance. After receiving the return instruction, the mobile robot returns from the current detection point to the first detection point in response to the return instruction.

The re-detection instruction is used to instruct the mobile robot to start to re-detect the ambient environment from the first detection point, to obtain new object distribution information. After receiving the re-detection instruction, the mobile robot starts to re-detect the ambient environment from the first detection point in response to the re-detection instruction, to obtain new object distribution information.

With reference to the second aspect, in some implementations of the second aspect, the recovering from an anomaly includes: sending a restart instruction to the mobile robot.

The restart instruction is used to instruct the mobile robot to restart, and re-detect the ambient environment after restarts. After the mobile robot receives the restart instruction, the mobile robot restarts in response to the restart instruction, and re-detects the ambient environment after the restart.

The restart instruction may not only instruct the mobile robot to reset an operating system, but also instruct the mobile robot to restart a corresponding sensor.

Restarting the operating system is similar to restarting a computer system, and restarting the sensor may be specifically disabling a port of the sensor and then re-enabling the port of the sensor.

The sensor of the mobile robot may include a laser radar, an encoder, a gyroscope, an ultrasonic sensor, an infrared sensor, and the like.

With reference to the second aspect, in some implementations of the second aspect, the method further includes: sending a clear instruction to the mobile robot.

The clear instruction is used to clear the current object distribution information. After receiving the clear instruction, the mobile robot clears the current object distribution information in response to the clear instruction.

The mobile robot is controlled to clear the current object distribution information, so that obtained object distribution information that may be not accurate enough due to a localization anomaly or a sensor fault can be cleared, and accuracy of the object distribution information obtained by the mobile robot can be ensured as far as possible.

With reference to the second aspect, in some implementations of the second aspect, the M detected environment maps all are located in a same coordinate system.

The M detected environment maps are located in a same coordinate system. Therefore, the M detected environment maps are more precisely merged to obtain a more accurate merged environment map.

With reference to the second aspect, in some implementations of the second aspect, the M detected environment maps all are maps located in a reference coordinate system, and an origin of the reference coordinate system may be at any one of the following locations: a location of a charging station of the mobile robot; a location at which the mobile robot stops after ending a task; or a location of a waste transfer station that goes with the mobile robot.

Specifically, a central point of any one of the foregoing locations or a point at another specific location can be used as the origin of the reference coordinate system.

According to a third aspect, a method for updating a working map of a mobile robot is provided. The method includes: detecting an ambient environment in a moving process to obtain environment layout information; determining a detected environment map based on the environment layout information detected in a detection cycle; sending M detected environment maps to a control apparatus; and receiving an updated environment layout map from the control apparatus.

The updated environment layout map is obtained by the control apparatus by performing weighting processing on a pixel value of a merged environment map currently obtained through merging and a pixel value of a currently stored environment layout map, and the merged environment map currently obtained through merging is obtained by merging the M detected environment maps.

In addition, the M detected environment maps are determined based on object distribution information detected by the mobile robot in a moving process, and M is an integer greater than 1.

The currently stored environment layout map is obtained by performing weighting processing on a merged environment map obtained the last time through merging and an environment layout map stored the last time, and the merged environment map obtained through merging the last time is obtained through merging based on M detected environment maps obtained the last time.

The method in the third aspect may be performed by a mobile robot.

In this application, the mobile robot obtains the M detected maps during working, and sends the M detected environment maps to the control apparatus, so that the control apparatus can update, based on the M detected environment maps, the environment layout map currently stored in the mobile robot, and the updated environment layout map can reflect a more detailed environment layout. This helps the mobile robot subsequently better execute a working task based on the updated environment layout map.

It should be understood that the mobile robot sending the M detected environment maps to the control apparatus may be as follows: The mobile robot sends the M detected environment maps to the control apparatus after generating all the M detected environment maps; or the mobile robot sends one detected environment map to the control apparatus each time generating the detected environment map, until the M detected environment maps are sent to the control apparatus.

With reference to the third aspect, in some implementations of the third aspect, the method further includes: sending current object distribution information to the control apparatus, so that the control apparatus determines a current detected environment map based on the current object distribution information; and receiving an anomaly recovery instruction sent by the control apparatus, and recovering from an anomaly in response to the anomaly recovery instruction.

The current object distribution information is object distribution information detected by the mobile robot in a preset interval or a preset distance, the preset interval is a time interval before the mobile robot reaches a current detection point, and the preset distance is a distance by which the mobile robot moves before the mobile robot reaches the current detection point.

The anomaly recovery instruction is generated by the control apparatus when consistency between the current detected environment map and the currently stored environment layout map is less than a second threshold. When consistency between the current detected environment map and the currently stored environment layout map is less than the second threshold, the control apparatus determines that the mobile robot is abnormal when detecting the ambient environment, and sends the anomaly recovery instruction to the mobile robot.

The anomaly recovery instruction is used to instruct the mobile robot to recover from an anomaly. After receiving the anomaly recovery instruction, the mobile robot recovers from the anomaly in response to the anomaly recovery instruction.

With reference to the third aspect, in some implementations of the third aspect, receiving an anomaly recovery instruction sent by the control apparatus, and recovering from an anomaly in response to the anomaly recovery instruction includes: receiving a return instruction and a re-detection instruction that are sent by the control apparatus; returning from the current detection point to a first detection point in response to the return instruction; and starting to re-detect the ambient environment from the first detection point in response to the re-detection instruction, to obtain new object distribution information.

The return instruction and the re-detection instruction may be two specific instructions in the anomaly recovery instruction.

The anomaly recovery instruction may further include a restart instruction, and the restart instruction is used to instruct the mobile robot to restart, and re-detect the ambient environment after the restart. After the mobile robot receives the restart instruction, the mobile robot restarts in response to the restart instruction, and re-detects the ambient environment after the restart.

The restart instruction may not only instruct the mobile robot to reset an operating system, but also instruct the mobile robot to restart a corresponding sensor.

Restarting the operating system is similar to restarting a computer system, and restarting the sensor may be specifically disabling a port of the sensor and then re-enabling the port of the sensor.

The sensor of the mobile robot may include a laser radar, an encoder, a gyroscope, an ultrasonic sensor, an infrared sensor, and the like.

With reference to the third aspect, in some implementations of the third aspect, the method further includes: receiving a clear instruction sent by the control apparatus; and clearing the current object distribution information in response to the clear instruction.

The current object distribution information is cleared, so that obtained object distribution information that may be not accurate enough due to a localization anomaly or a sensor fault can be cleared, and accuracy of the object distribution information obtained by the mobile robot can be ensured as far as possible.

The M detected environment maps are located in a same coordinate system. Therefore, the M detected environment maps are more precisely merged to obtain a more accurate merged environment map.

With reference to the third aspect, in some implementations of the third aspect, the M detected environment maps all are maps located in a reference coordinate system, and an origin of the reference coordinate system may be at any one of the following locations: a location of a charging station of the mobile robot; a location at which the mobile robot stops after ending a task; or a location of a waste transfer station that goes with the mobile robot.

Specifically, a central point of any one of the foregoing locations or a point at another specific location can be used as the origin of the reference coordinate system.

According to a fourth aspect, a method for updating a working map of a mobile robot is provided. The method includes: detecting an ambient environment in a moving process to obtain environment layout information; determining a detected environment map based on the environment layout information detected in a detection cycle; when M detected environment maps are obtained, merging the M detected environment maps to obtain a merged environment map currently obtained through merging; and performing weighting processing on a pixel value of the merged environment map currently obtained through merging and a pixel value of a currently stored environment layout map to obtain an updated environment layout map.

The currently stored environment layout map is obtained by performing weighting processing on a merged environment map obtained last time through merging and an environment layout map stored the last time, and the merged environment map obtained through merging the last time is obtained through merging based on M detected environment maps obtained the last time.

The method in the fourth aspect may be performed by a mobile robot.

In this application, a plurality of detected maps obtained by the mobile robot during working are obtained to update the environment layout map currently stored in the mobile robot, so that the updated environment layout map can reflect a more detailed environment layout. This helps the mobile robot subsequently better execute a working task based on the updated environment layout map.

With reference to the fourth aspect, in some implementations of the fourth aspect, before merging the M detected environment maps, the method further includes: determining whether the M detected environment maps are obtained.

Specifically, each time one detected environment map is generated, a quantity of detected environment maps may be counted to determine whether a quantity of generated detected environment maps reaches M.

With reference to the fourth aspect, in some implementations of the fourth aspect, the method further includes: determining a current detected environment map based on current object distribution information; when consistency between the current detected environment map and the currently obtained environment layout map is less than a second threshold, determining that the mobile robot is abnormal when detecting the ambient environment; and recovering from an anomaly.

The current object distribution information is object distribution information detected by the mobile robot in a preset interval or a preset distance, the preset interval is a time interval before the mobile robot reaches a current detection point, and the preset distance is a distance by which the mobile robot moves before the mobile robot reaches the current detection point.

With reference to the fourth aspect, in some implementations of the fourth aspect, recovering from an anomaly includes: returning from the current detection point to a first detection point, where a distance between the first detection point and the current detection point is the preset distance; and starting to re-detect the ambient environment from the first detection point, to obtain new object distribution information.

Specifically, when the method in the fourth aspect is performed by a mobile robot, the mobile robot may control a movement platform of the mobile robot to return from the current detection point to the first detection point. The mobile robot may control a sensor to re-detect the ambient environment, to obtain new object distribution information.

With reference to the fourth aspect, in some implementations of the fourth aspect, the method further includes: clearing the current object distribution information.

Specifically, when the method in the fourth aspect is performed by a mobile robot, the mobile robot may erase the current object distribution information stored in a storage module.

With reference to the fourth aspect, in some implementations of the fourth aspect, recovering from an anomaly includes: performing a restart operation.

The ambient environment can be re-detected after the restart.

The restart operation may be resetting an operating system, or may be restarting a corresponding sensor.

Restarting the operating system is similar to restarting a computer system, and restarting the sensor may be specifically disabling a port of the sensor and then re-enabling the port of the sensor.

The sensor of the mobile robot may include a laser radar, an encoder, a gyroscope, an ultrasonic sensor, an infrared sensor, and the like.

It should be understood that in the method in the first aspect, extension and description of a corresponding process (for example, a merged environment map generation process, a map update process, or the like) and corresponding information (for example, the detected environment map)

are also applicable to the method in any one of the second aspect, the third aspect, or the fourth aspect.

According to a fifth aspect, an apparatus for updating a working map of a mobile robot is provided, and the apparatus includes modules configured to perform the method in the first aspect or the second aspect.

According to a sixth aspect, a mobile robot is provided, and the mobile robot includes modules configured to perform the method in the third aspect or the fourth aspect.

According to a seventh aspect, an apparatus for updating a working map of a mobile robot is provided. The apparatus includes: a memory, configured to store a program; and a processor, configured to execute the program stored in the memory. When the program stored in the memory is executed, the processor is configured to perform the method in the first aspect.

According to an eighth aspect, an apparatus for updating a working map of a mobile robot is provided. The apparatus includes: a transceiver; a memory, configured to store a program; and a processor, configured to execute the program stored in the memory. When the program stored in the memory is executed, the transceiver and the processor are configured to perform the method in the second aspect.

According to a ninth aspect, a mobile robot is provided. The mobile robot includes: a transceiver; a memory, configured to store a program; and a processor, configured to execute the program stored in the memory. When the program stored in the memory is executed, the transceiver and the processor are configured to perform the method in the third aspect.

According to a tenth aspect, a mobile robot is provided. The mobile robot includes: a memory, configured to store a program; and a processor, configured to execute the program stored in the memory. When the program stored in the memory is executed, the processor is configured to perform the method in the fourth aspect.

According to an eleventh aspect, a computer storage medium is provided. The computer storage medium stores program code, and the program code includes instructions used to perform the steps in the method in any one of the first aspect, the second aspect, the third aspect, and the fourth aspect.

The storage medium may be specifically a nonvolatile storage medium.

According to a twelfth aspect, a computer program product including instructions is provided. When the computer program product runs on a computer, the computer is enabled to perform the method in any one of the first aspect, the second aspect, the third aspect, and the fourth aspect.

According to a thirteenth aspect, a chip is provided. The chip includes a processor and a data interface. The processor reads, through the data interface, instructions stored in a memory to perform the method in any one of the first aspect, the second aspect, the third aspect, and the fourth aspect.

Optionally, in an implementation, the chip may further include the memory. The memory stores the instructions, and the processor is configured to execute the instructions stored in the memory. When the instructions are executed, the processor is configured to perform the method in any one of the first aspect, the second aspect, the third aspect, and the fourth aspect.

The chip may be specifically a field programmable gate array (FPGA) or an application-specific integrated circuit (ASIC).

It should be understood that the method in any one of the foregoing aspects may be specifically the method in any one of the foregoing aspects and the method in any implementation in any one of the foregoing aspects.

DESCRIPTION OF EMBODIMENTS

The following describes technical solutions in this application with reference to the accompanying drawings.

A mobile robot in this application may be a robot that can move in an indoor environment (for example, an environment such as a home, a shopping center, or a factory workshop) and execute a specific task. Specifically, the mobile robot may include a vacuum cleaning robot, an autonomous mobile robot, and the like.

Figure 1:
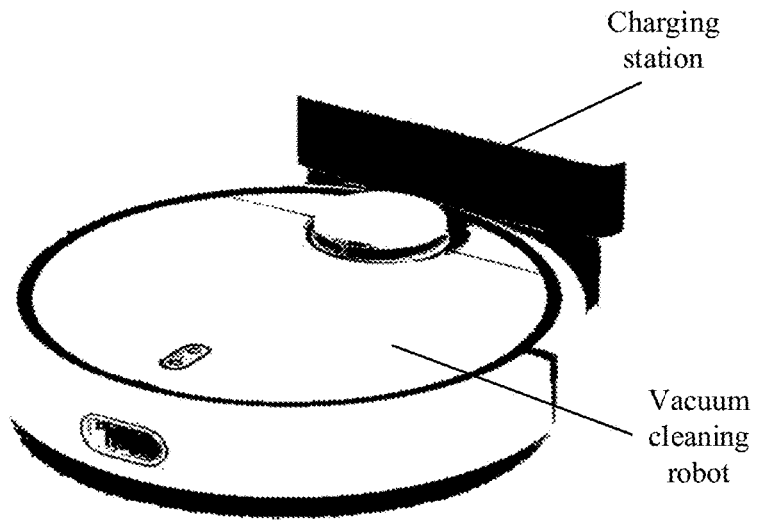
FIG. 1 is a schematic diagram of a vacuum cleaning robot.

For example, FIG. 1 shows a common vacuum cleaning robot, and the vacuum cleaning robot may be charged by using a charging station.

When executing a task, the mobile robot usually first obtains object distribution in a corresponding workplace, that is, first obtains an environment layout map in the workplace, and then executes a specific task based on the environment layout map. However, object distribution in a same workplace may change. Therefore, to enable the mobile robot to better execute a working task, a working map of the mobile robot needs to be updated. A method for updating a working map of a mobile robot in the embodiments of this application is described below in detail with reference to FIG. 2.

Figure 2:
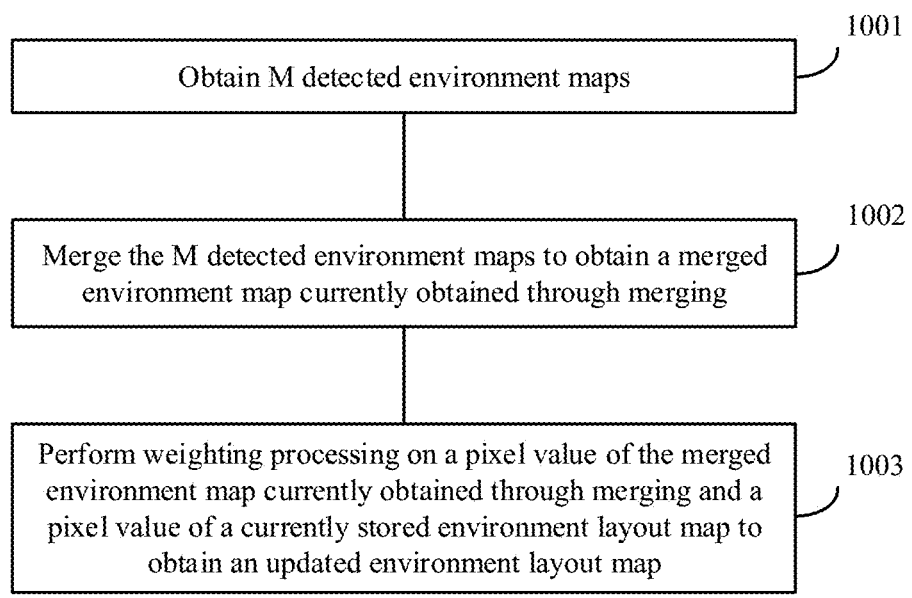
FIG. 2 is a schematic flowchart of a method for updating a working map of a mobile robot according to an embodiment of this application.

FIG. 2 is a schematic flowchart of a method for updating a working map of a mobile robot according to an embodiment of this application. The method shown in FIG. 2 may be performed by a control apparatus of the mobile robot. The control apparatus is configured to update the working map of the mobile robot. The control apparatus may be a control module located inside the mobile robot, or may be an independent device located outside the mobile robot.

When the control apparatus is an independent device located outside the mobile robot, the control apparatus may be an electronic device. The electronic device may be specifically a mobile terminal (for example, a smartphone), a tablet computer, a notebook computer, an augmented reality/virtual reality device, a wearable device, or the like.

The method shown in FIG. 2 includes steps 1001 to 1003. The following separately describes the steps in detail.

1001. Obtain M detected environment maps.

The M detected environment maps may be determined based on object distribution information detected by the mobile robot in a moving process.

In a first workplace, the mobile robot detects a surrounding object to obtain object distribution information.

Optionally, obtaining M detected environment maps includes: controlling the mobile robot to detect surrounding objects to obtain object distribution information in the first place; and determining the M detected environment maps based on the object distribution information in the first place.

Figure 3:
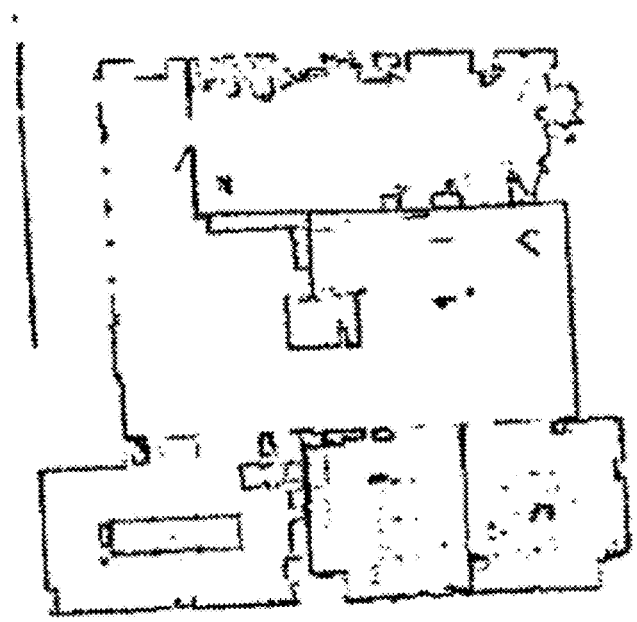
FIG. 3 is a schematic diagram of a detected environment map.

The detected environment map obtained in step 1001 may be shown in FIG. 3. As shown in FIG. 3, the detected environment map displays a contour line or a boundary line of an object in a home environment. The detected environment map is determined based on object distribution information obtained when the mobile robot detects a surrounding object in the home environment.

Optionally, a value of M is a preset.

A specific value of M may be set by a manufacturer before delivery, or may be set by a user before the mobile robot performs detection.

In addition to being preset, the value of M may be flexibly set by using detected environment map quantity configuration information.

Optionally, before step 1001, the method shown in FIG. 1 further includes: obtaining the detected environment map quantity configuration information, where the detected environment map quantity configuration information includes the value of M; and determining the value of M based on the detected environment map quantity configuration information.

In this application, M can be flexibly set by using the detected environment map quantity configuration information, so that a corresponding quantity of detected environment maps can be obtained based on a requirement.

The detected environment map quantity configuration information may be information input by a user. For example, when the method is performed by the control apparatus, the user may input the detected environment map quantity configuration information through a control interface of the control apparatus. The detected environment map quantity configuration information includes a specific value of M.

In addition, the value of M may be further adjusted by using the detected environment map quantity modification information. Specifically, the user may input detected environment map quantity modification information to the control apparatus. After receiving the detected environment map quantity modification information, the control apparatus can adjust the value of M based on the detected environment map quantity modification information.

Optionally, the M detected environment maps are determined based on object distribution information detected when the mobile robot executes a working task in the first workplace.

In this application, the M detected environment maps are determined by using the object distribution information detected when the mobile robot executes a working task, so that the object distribution information can be obtained when the mobile robot executes another task, thereby improving working efficiency.

Optionally, the M detected environment maps are respectively determined based on M pieces of object distribution information, and the M pieces of object distribution information are respectively object distribution information obtained by detecting an ambient environment when the mobile robot executes M working tasks in the first workplace.

In other words, any one of the M detected environment maps is determined based on object distribution information detected when the mobile robot executes a corresponding working task.

For example, an $i^{th}$ detected environment map in the M detected environment maps may be determined based on object distribution information obtained by detecting an ambient environment when the mobile robot executes a $j^{th}$ working task, where both i and j are positive integers, $1 \leq i \leq M$, $1 \leq j \leq M$, and i and j may be the same or may be different.

In this application, each of the M detected environment maps is determined based on the object distribution information obtained when the mobile robot executes a working task in the first workplace, so that each detected environment map can comprehensively reflect object distribution in the first place as far as possible, and a finally obtained updated environment layout map can comprehensively reflect object distribution in the first place.

Optionally, obtaining M detected environment maps includes: obtaining the detected environment map based on the object distribution information obtained by detecting the ambient environment when the mobile robot executes a working task in the first workplace, until the M detected environment maps are obtained.

In other words, in this application, the detected environment maps may be obtained one by one until a quantity of detected environment maps reaches M.

In this application, a quantity of obtained detected environment maps may be counted in real time. When the quantity of the detected environment maps reaches M, a merged environment map can be determined based on the M detected environment maps.

It should be understood that when the merged environment map is determined based on the M detected environment maps, the detected environment map may further continue to be obtained. When M detected environment maps are obtained again, the merged environment map is determined again based on the obtained M detected environment maps.

In this application, the mobile robot may detect the ambient environment by using a sensor or a detector of the mobile robot, to obtain surrounding object distribution information.

The sensor or detector may specifically include at least one of a camera (which may be specifically a depth camera), an infrared sensor, a ranging radar, and an ultrasonic sensor.

In the method shown in FIG. 2, a detected environment map set C (which is referred to as a set C below for short) may be further created in a map update process. The set C is used to store an obtained detected environment map. When a quantity of detected environment maps in the set C reaches M, the M detected environment maps in the set C all may be written into an environment layout map update set D (which is referred to as a set D below for short), and the detected environment maps stored in the set C are cleared (a detected environment map obtained subsequently may be stored in the set C). In this way, the M detected environment maps in the set D are used to determine the merged environment map.

Further, an abnormal detected environment map in the set D may be eliminated to obtain an environment layout map update set Ds, and then the merged environment map is determined by using detected environment maps in the set Ds.

1002. Merge the M detected environment maps to obtain a merged environment map currently obtained through merging.

When the M detected environment maps are merged (specifically, the M detected environment maps may be superposed) to obtain the merged environment map in step 1002, the M detected environment maps may be directly merged; or the M detected environment maps may be merged after specific preprocessing (for example, filtering processing or noise reduction processing) is performed on the M detected environment maps; or specific selection may be performed on the M detected environment maps, and then selected detected environment maps are merged.

There may be three different manners of determining the merged environment map in step 1002, and the three manners are separately described below in detail.

In a first manner, the M detected environment maps are directly merged to obtain the merged environment map currently obtained through merging.

In the first manner, when the M detected environment maps are merged, specifically, pixel values of the M detected environment maps are averaged, and an obtained average pixel value is used as a pixel value of the merged environment map.

In the first manner, after the M detected environment maps are obtained, the M detected environment maps are directly merged, so that the merged environment map can be conveniently and quickly determined.

In a second manner, detected environment maps with better consistency are determined from the M detected environment maps and are then merged.

In the second manner, merging the M detected environment maps to obtain a merged environment map currently obtained through merging specifically includes: determining N detected environment maps from the M detected environment maps; and merging the N detected environment maps to obtain the merged environment map currently obtained through merging.

Consistency between any two of the N detected environment maps is greater than or equal to a first threshold, and N is a positive integer less than or equal to M. When N=M, it indicates that consistency between any two of the M detected environment maps meets a requirement.

The first threshold may be a preset threshold, and a value of the first threshold may be set based on a requirement. When the mobile robot has a high requirement on map precision during working, the first threshold may be set to a large value. However, when the robot has a low requirement on map precision during working, the first threshold may be set to a small value. For example, the first threshold may be set to 0.7.

In addition, consistency between two detected environment maps may be represented by a degree of matching between grids of the two detected environment maps. If a degree of matching between grids of two detected environment maps is higher, consistency between the two detected environment maps is higher.

It is assumed that there are two detected environment maps Mi and Mj. If S(Mi)>S(Mj) (an area of the map Mi is greater than an area of the map Mj), consistency c between the maps Mi and Mj may be calculated by using the following formulas (1) and (2).

$$c = \frac{\sum \phi(O_{mn}^j)}{\sum O_{mn}^j} \quad (1)$$

$$\phi(O_{mn}^j) = \begin{cases} 1 & \|O_{mn}^j - O_{xy}^j\| \le r \\ 0 & \|O_{mn}^j - O_{xy}^j\| \ge r \end{cases} \quad (2)$$

In the formulas, $O_{mn}^j$ is a grid point on the map Mj; m and n are indexes of $O_{mn}^j$, r is a radius of a neighboring area in which the grid point $O_{mn}^j$ on the map Mj corresponds to a grid point on the map Mi, and herein a value of r may be 2.

Therefore, consistency between any two of the M detected maps may be calculated by using the formulas (1) and (2), and detected environment maps with consistency meeting a requirement (which may be greater than a specific threshold) may be selected from the M detected maps.

A process of merging the N detected environment maps is similar to the foregoing process of merging the M detected environment maps. Details are not described herein again.

In the second manner, detected environment maps with better consistency are selected from the M detected environment maps and merged, so that a more accurate merged environment map usually can be obtained.

In a third manner, the M detected environment maps are preprocessed, and then preprocessed M detected environment maps are merged to obtain the merged environment map currently obtained through merging.

In the third manner, merging the M detected environment maps to obtain a merged environment map currently obtained through merging specifically includes: preprocessing the M detected environment maps to obtain preprocessed M detected environment maps; and merging the preprocessed M detected environment maps to obtain the merged environment map currently obtained through merging.

Preprocessing the M detected environment maps may be as follows: When there is an image area that is in one of the M detected maps and that has image content with a large difference from that in another detected environment map, the image content in the image area is deleted.

For example, the M detected environment maps include a first detected environment map, and image content in an area A in the first detected environment map is different from that in another detected environment map (a detected environment map other than the first detected environment map in the M detected environment maps) in the M detected environment maps. In this case, the image content in the area A in the first detected environment map may be deleted or cleared to obtain preprocessed first detected environment map.

Consistency between any two of the preprocessed M detected environment maps may be greater than or equal to a third threshold. The third threshold may be a preset threshold, and a value of the third threshold may be set based on an actual requirement. When the robot has a high requirement on map precision during working, the third threshold may be set to a large value. However, when the robot has a low requirement on map precision during working, the third threshold may be set to a small value.

It should be understood that the third threshold in the third manner and the first threshold in the second manner may be the same or may be different.

In the third manner, image content that is in the M detected environment maps and that has a large difference from that in another detected environment map is removed, and then the detected environment maps are merged, so that a more accurate merged environment map usually can be obtained.

In addition, before the merged environment map is obtained in the three manners, filtering processing or noise reduction processing may be performed on the M detected environment maps before subsequent processing is performed.

In other words, in step 1002, before the merged environment map is determined based on the M detected environment maps, the detected environment maps are first filtered, and then the merged environment map is determined based on detected environment maps obtained after filtering processing.

Optionally, determining a merged environment map based on the M detected environment maps includes: performing filtering processing on the M detected environment maps to obtain M detected environment maps obtained after filtering processing; and merging the M detected environment maps obtained after filtering processing to obtain the merged environment map currently obtained through merging.

The filtering processing herein may be specifically morphological filtering to extract a line feature of an image.

Filtering processing is performed on the detected environment map, so that interference of a small object in an environment can be removed, thereby providing a main layout of the environment.

Figure 4:
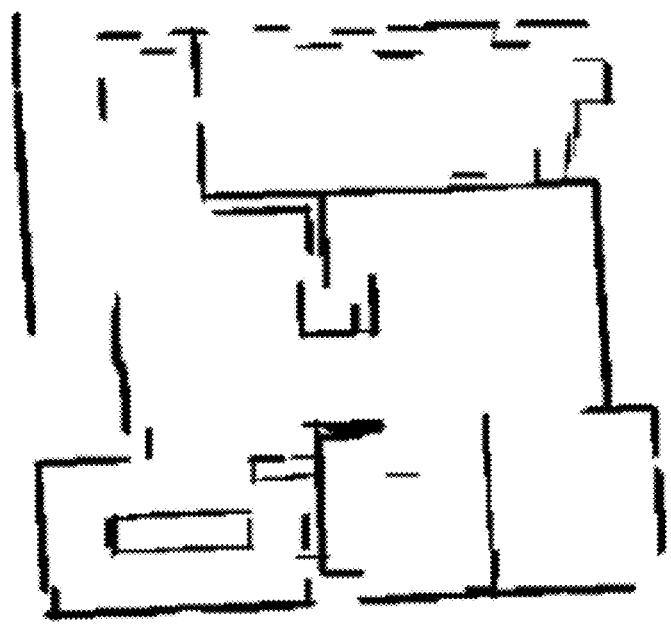
FIG. 4 is a schematic diagram of a detected environment map obtained after filtering processing.

For example, a detected environment map before filtering processing may be shown in FIG. 3, and filtering processing may be performed on the detected environment map shown in FIG. 3 to obtain a detected environment map shown in FIG. 4. Compared with FIG. 3, the detected environment map in FIG. 4 has less image noise and can display a main layout of an environment.

It is assumed that in step 1002, the set C stores M detected environment maps, and the M detected environment maps are written into the set D; and then an abnormal map in the set D is removed to obtain the set Ds, where the set Ds includes N detected environment maps. In this case, when the merged environment map is determined based on the N detected environment maps in the set Ds, the following steps may be performed.

Step A: Obtain a map boundary ($x_{min}$, $x_{max}$) and ($y_{min}$, $y_{max}$) of the merged environment map based on the set Ds.

Specifically, the N detected environment maps in the set Ds all are maps located in a same coordinate system. It is assumed that in the set Ds, coordinates of a left top point of the map is ($O_{ix}^B$, $O_{iy}^B$), and coordinates of a right bottom point of the map is ($P_{ix}^B$, $P_{iy}^B$), where i={1, 2, . . . , n}. In this case, the map boundary of the merged environment map may be determined according to formulas (3) and (4).

$$\begin{cases} x_{min} = \min\{O_{ix}^B, P_{ix}^B\}_{i=1,\ldots,n} \\ y_{max} = \max\{O_{ix}^B, P_{ix}^B\}_{i=1,\ldots,n} \end{cases} \quad (3)$$

$$\begin{cases} y_{min} = \min\{O_{iy}^B, P_{iy}^B\}_{i=1,\ldots,n} \\ y_{max} = \max\{O_{iy}^B, P_{iy}^B\}_{i=1,\ldots,n} \end{cases} \quad (4)$$

Step B: Determine the merged environment map based on the set Ds.

Specifically, in step B, a size of the merged environment map may be first determined based on the map boundary of the merged environment map. Then a merged environment map that uses ($x_{min}$, $y_{min}$) as an image origin (the image origin is located at an upper left corner of the merged environment map) is created, and grid points in the N detected maps in the set Ds are sequentially projected into the merged environment map. Values of pixels of the merged environment map are a set of pixel values of pixels of the N detected maps in the set Ds.

For example, the merged environment map may be determined according to formula (5).

$$O_{ij}^{M\_pre} = \frac{1}{n}\sum_{k=1,\ldots,n} O_{ij}^{M\_k} \quad (5)$$

In the formula, $O_{ij}^{M\_pre}$ is a pixel value of a pixel (i, j) in a map M_pre, and $O_{ij}^{M\_k}$ is a corresponding pixel value in a map M_k. The merged environment map may be obtained according to formula (5), and the merged environment map may be denoted as M_pre. Filtering processing may be performed on M_pre to obtain a merged environment map obtained after filtering processing, which is denoted as M_obs.

1003. Perform weighting processing on a pixel value of the merged environment map and a pixel value of an environment layout map to obtain an updated environment layout map.

The environment layout map is an environment layout map that is of the first workplace and that is currently stored in the mobile robot. After completing updating of the environment layout map to obtain the updated environment layout map, the mobile robot may replace the original environment layout map, and store the updated environment layout map. Until a next map update, the mobile robot re-updates the environment layout map based on a detected environment map that is detected.

Figure 5:
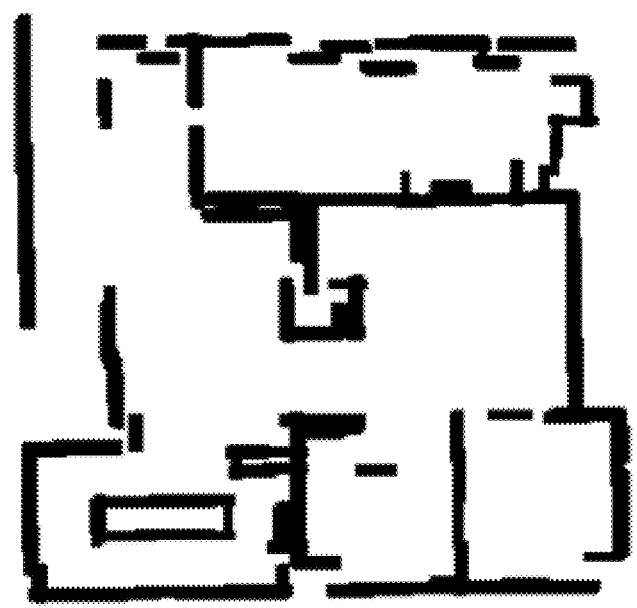
FIG. 5 is a schematic diagram of an environment layout map.

The environment layout map or the updated environment layout map in step 1003 may be shown in FIG. 5. The environment layout map shown in FIG. 5 displays an object layout in a home environment.

In this application, the environment layout map stored in the mobile robot is updated by using a plurality of detected maps obtained by the mobile robot during working, so that the updated environment layout map can reflect a more detailed environment layout. This helps the mobile robot subsequently better execute a working task based on the updated environment layout map.

When weighting processing is performed on the pixel value of the merged environment map and the pixel value of the environment layout map in step 1003, a weight corresponding to the pixel value of the merged environment map currently obtained through merging is a first weight, and a weight corresponding to the pixel value of the currently stored environment layout map is a second weight. The first weight and the second weight may be determined based on a map update requirement of the mobile robot.

The map update requirement of the mobile robot may be a requirement of the mobile robot (during execution of a task) on a speed (or a frequency) of updating the environment layout map, or may be a requirement of the mobile robot (during execution of a task) on an amount of updating the environment layout map.

Generally, when the mobile robot requires to quickly update the environment layout map, the first weight may be set to a large value, and the second weight may be set to a small value. On the contrary, when the mobile robot does not require to quickly update the environment layout map, the first weight may be set to a small value, and the second weight may be set to a large value.

In addition, when the mobile robot requires a large amount of updating the environment layout map, the first weight may be set to a large value, and the second weight may be set to a small value. On the contrary, when the mobile robot requires a small amount of updating the environment layout map, the first weight may be set to a small value, and the second weight may be set to a large value.

In this application, because the first weight and the second weight are determined based on the map update requirement of the mobile robot, the environment layout map may be flexibly updated based on the map update requirement of the mobile robot.

Optionally, determining that values of the first weight and the second weight based on a map update requirement of the mobile robot includes: the first weight is in a positive correlation with an environment layout map update frequency required by the mobile robot, and the second weight is in a negative correlation with the environment layout map update frequency required by the mobile robot.

To be specific, when the mobile robot (during execution of a task) requires a high map update frequency, the first weight may be set to a large value, and the second weight may be set to a small value (for example, the first weight value is set to 0.7, and the second weight value is set to 0.3). On the contrary, when the mobile robot (during execution of a task) requires a low map update frequency, the first weight may be set to a small value, and the second weight may be set to a large value (for example, the first weight value is set to 0.3, and the second weight value is set to 0.7).

Optionally, determining that values of the first weight and the second weight based on a map update requirement of the mobile robot includes: the first weight is in a positive correlation with an environment layout map update amount required by the mobile robot, and the second weight is in a negative correlation with the environment layout map update amount required by the mobile robot.

In addition, the first weight and the second weight may be preset.

Optionally, the first weight and the second weight are set by a user. For example, the user may change the values of the first weight and the second weight through a control interface.

It should be understood that the user may indirectly set the first weight and the second weight by setting another parameter. For example, the user may indirectly set the first weight and the second weight by setting a map update frequency parameter.

In this application, because the first weight and the second weight are determined based on the map update requirement of the mobile robot, the environment layout map may be flexibly updated based on the map update requirement of the mobile robot.

The environment layout map in step 1003 may be denoted as Mr. In step 1003, the map Mr may be updated according to formula (6) to obtain the updated environment layout map.

$$M_{r\_new} = \alpha * M_{r\_old} + (1-\alpha) * M_{obs} \qquad (6)$$

In formula (6), $M_{r\_old}$ represents the environment layout map, $M_{r\_new}$ represents the updated environment layout map, $M_{obs}$ represents a merged environment map obtained after filtering processing, $\alpha$ is a weight (which is equivalent to the second weight in the foregoing description) of $M_{r\_old}$, and $(1-\alpha)$ is a weight (which is equivalent to the first weight in the foregoing description) of $M_{obs}$. In this application, a value of $\alpha$ may be specifically 0.7. In this case, during merging, the weight of $M_{r\_old}$ is 0.7, and the weight of $M_{obs}$ is 0.3.

After $M_{r\_new}$ is obtained according to formula (6), a value of a pixel in $M_{r\_new}$ is compared with a grid threshold. If the pixel value is greater than the threshold (the threshold may be set to 180 in this application), the pixel is an occupied point in an environment; or if the pixel value is not greater than the threshold, the pixel is considered as a free point.

In this application, the environment layout map may be actually considered as a probability map, and the pixel value of the environment layout map ranges from 0 to 255, where 0 indicates that a grid point/a pixel is occupied (there is an obstacle), 255 indicates that a grid point is idle (there is no obstacle), another value indicates a probability of being idle (a value closer to 255 indicates a greater probability of being idle).

In this application, each of the M detected environment maps may be determined based on object distribution information detected when the mobile robot executes a task. For a more detailed understanding of a process of determining a detected environment map based on object distribution information detected during a task, FIG. 6 is used as an example below for detailed description.

Figure 6:
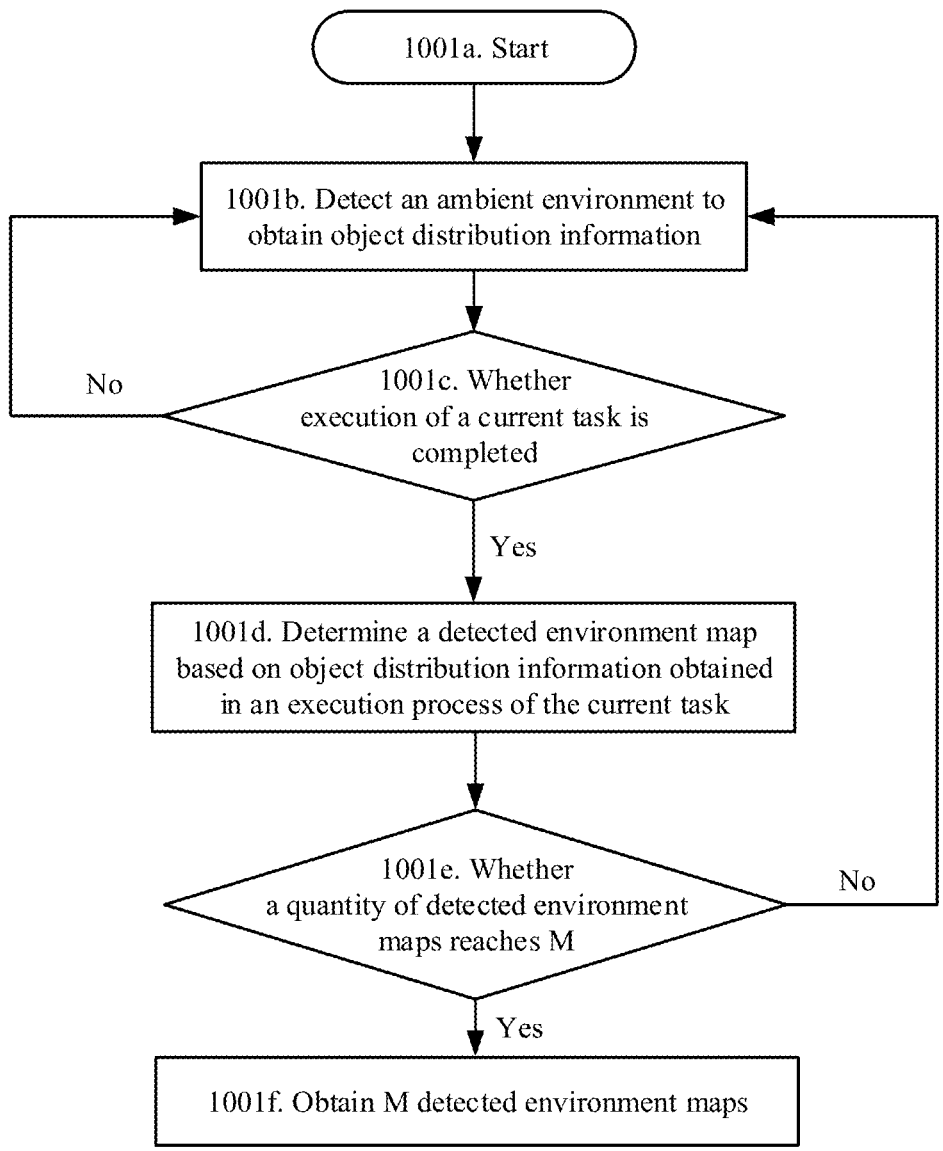
FIG. 6 is a schematic diagram of a process of obtaining M detected environment maps.

FIG. 6 is a schematic diagram of a process of obtaining M detected environment maps. The process shown in FIG. 6 includes steps 1001*a* to 1001*f*. These steps may be considered as a refinement or specific implementation of step 1001. These steps are described below in detail.

1001*a*. Start.

Step 1001*a* indicates that the M detected environment maps start to be obtained.

1001*b*. Detect an ambient environment to obtain object distribution information.

In step 1001*b*, a mobile robot may detect the ambient environment (or a surrounding object) by using a detector or a sensor (the detector or the sensor may be specifically a camera, an infrared sensor, a ranging radar, and an ultrasonic sensor) of the mobile robot under control of a control apparatus (the control apparatus may be a separate control device or may be a control module located inside the mobile robot), to obtain the object distribution information that reflects a surrounding object distribution.

1001*c*. Determine whether execution of a current task is completed.

In step 1001*c*, the mobile robot may determine whether execution of the current task is completed. For example, a vacuum cleaning robot is used as an example. When determining whether execution of the current task is completed, the vacuum cleaning robot may specifically determine whether a currently cleaned area meets a preset requirement or whether cleaning time meets a preset requirement. If the currently cleaned area meets the preset requirement or the cleaning time meets the preset requirement, the vacuum cleaning robot can determine that execution of the current task is completed.

If it is determined in step 1001*c* that execution of the current task is completed, step 1001*d* is performed to determine a detected environment map. Alternatively, if it is determined in step 1001*c* that execution of the current task is not completed, step 1001*b* may be re-performed.

1001*d*. Determine a detected environment map based on object distribution information obtained in an execution process of the current task.

It should be understood that in step 1001*d*, the mobile robot may send the object distribution information obtained in the execution process of the current task to the control apparatus, and the control apparatus (the control apparatus may be a separate control device or a control module located inside the mobile robot) determines a detected environment map based on the object distribution information.

1001*e*. Determine whether a quantity of detected environment maps reaches M.

When it is determined in step 1001*e* that the quantity of detected environment maps has reached M, step 1001*f* is performed, that is, M detected environment maps are obtained. Alternatively, when it is determined in step 1001*e* that the quantity of detected environment maps does not reach M, step 1001*b* is re-performed.

In step 1001*e*, the control apparatus may count a quantity of obtained detected environment maps. When the quantity of detected environment maps does not reach M, the control apparatus continues to control the mobile robot to obtain the object distribution information until M detected environment maps are obtained.

1001*f*. Obtain M detected environment maps.

It should be understood that in the process shown in FIG. 6, a detected environment map may be determined based on (all) object distribution information obtained in each task execution process. Actually, in this application, a detected environment map may alternatively be determined based on some object distribution information obtained in each task execution process. In other words, one or more detected environment maps may be determined based on all the object distribution information obtained in each task execution process.

In addition, in this application, a detected environment map may be determined based on (all) object distribution information obtained in a process of executing a plurality of tasks by the mobile robot.

In other words, in this application, a detected environment map may be determined based on all object distribution information obtained in a process of executing one task by the mobile robot, or may be determined based on some object distribution information obtained in a process of executing one task by the mobile robot, or may be determined based on some object distribution information obtained in a process of executing a plurality of (two or more) tasks by the mobile robot.

In this application, in the process of obtaining the M detected environment maps, to ensure accuracy of each obtained detected environment map to avoid that an obtained detected environment map is not accurate enough due to a localization anomaly or a detection anomaly, a real-time detected environment map corresponding to specific preset time may be obtained based on object distribution information obtained by the mobile robot in the preset time, and then the real-time detected environment map is compared with an environment layout map currently stored in the mobile robot. If a difference between the real-time detected environment map and the currently stored environment layout map is large, the large difference may be caused by the following: The object distribution information obtained in the current period of time is not accurate enough due to a localization fault or anomaly. In this case, the object distribution information obtained in the current period of time may be discarded, to ensure accuracy of the obtained M detected environment maps.

In other words, in the process of obtaining the M detected environment maps, object distribution information that may be obtained due to a localization anomaly may be excluded, so that the obtained object distribution information is more accurate.

Figure 7:
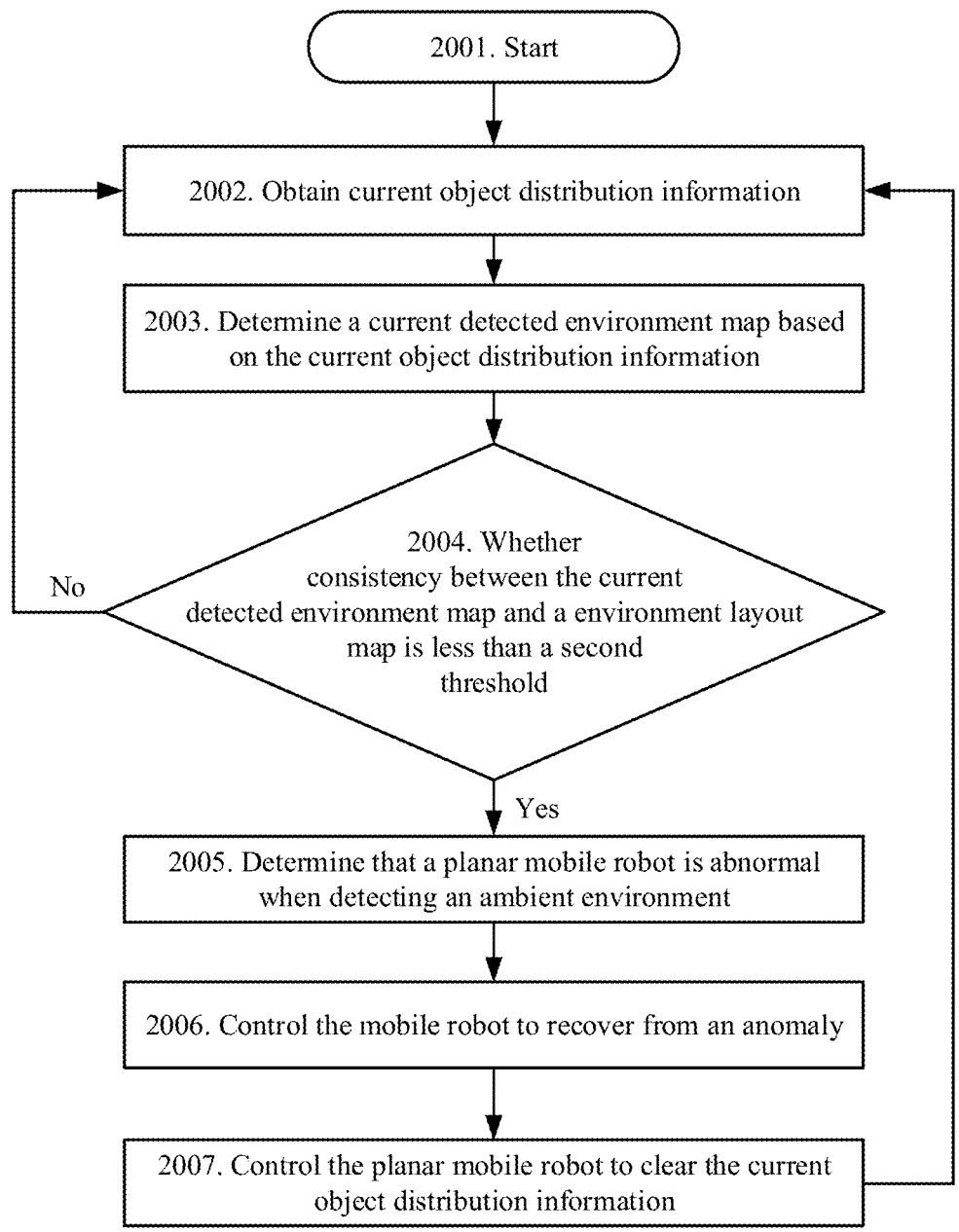
FIG. 7 is a schematic diagram of a process of obtaining object distribution information according to an embodiment of this application.

FIG. 7 is a schematic diagram of a process of obtaining object distribution information according to an embodiment of this application. The process shown in FIG. 7 includes steps 2001 to 2007. These steps may occur in the process of obtaining the M detected environment maps in step 1001. The steps 2001 to 2007 are described below in detail.

2001. Start.

Step 2001 indicates that a current detected map starts to be obtained.

2002. Obtain current object distribution information.

The current object distribution information is object distribution information detected by the mobile robot in a preset interval or a preset distance, the preset interval is a time interval before the mobile robot reaches a current detection point, and the preset distance is a distance by which the mobile robot moves before the mobile robot reaches the current detection point.

The preset interval may be a time interval set by a person, and the preset distance may be a distance set by a person. The preset interval and the preset distance may be flexibly set based on a specific requirement.

2003. Determine a current detected environment map based on the current object distribution information.

The current detected environment map in step 2003 may be specifically obtained in the following two manners.

Manner A: The current detected environment map is determined based on object distribution information obtained by the mobile robot in a preset period of time.

For example, in manner A, the current detected environment map may be determined based on object distribution information obtained by the mobile robot each time the mobile robot works for five minutes.

It should be noted that an example of five minutes is only used herein for description. In this application, the current detected environment map may be determined based on object distribution information obtained in any other time length.

Manner B: The current detected environment map is determined based on object distribution information obtained by the mobile robot in the preset distance.

For example, in manner B, the current detected environment map may be determined based on object distribution information obtained by the mobile robot each time the mobile robot moves five meters.

It should be noted that a distance of five meters is only used as an example herein for description. In this application, the current detected environment map may be determined based on object distribution information obtained by the mobile robot when the mobile robot moves any other distance.

2004. Determine whether consistency between the current detected environment map and an environment layout map is less than a second threshold.

When it is determined in step 2004 that consistency between the current detected environment map and the environment layout map is less than the second threshold, it indicates that a difference between the current detected environment map and the environment layout map is large. This may be caused by the following: The obtained object distribution information is not accurate due to inaccurate localization, a fault of a sensor, or a fault of another module, and consequently the obtained current detected environment map is not accurate enough. Therefore the current detected environment map needs to be re-obtained, that is, step 2005 is performed.

When it is determined in step 2004 that consistency between the current detected environment map and the environment layout map is greater than or equal to the second threshold, it indicates that a difference between the current detected environment map and the environment layout map is small. The mobile robot can be controlled to continue to perform detection, that is, step 2002 is re-performed.

The second threshold may be a preset threshold, and a value of the second threshold may be related to precision of an environment layout map that finally needs to be obtained. When precision of the environment layout map that finally needs to be obtained is high, the second threshold may be set to a large value. However, when precision of the environment layout map that finally needs to be obtained is low, the second threshold may be set to a small value. Herein, the second threshold may be specifically set to 0.6.

2005. Determine that the mobile robot is abnormal when detecting an ambient environment.

That the mobile robot is abnormal when detecting the ambient environment may mean that the mobile robot cannot detect accurate object distribution information in a process of detecting the ambient environment due to a specific fault. Specifically, the mobile robot may be unable to accurately detect the object distribution information due to a localization fault, a sensor fault, or faults of some processing modules inside the mobile robot.

2006. Control the mobile robot to recover from an anomaly.

There may be a plurality of manners of controlling the mobile robot to recover from an anomaly in step 2006, and commonly used anomaly recovery manners are described below.

Anomaly recovery manner 1: A return operation is performed to obtain new object distribution information.

In anomaly recovery manner 1, the mobile robot may be controlled to return from the current detection point to a first detection point, and the mobile robot is controlled to start to re-detect the ambient environment from the first detection point, to obtain new object distribution information.

A distance between the first detection point and the current detection point is the preset distance. The preset distance may be a distance set by a person, and a specific value of the distance may be flexibly set based on experience.

The ambient environment starts to be re-detected, so that the new object distribution information can be obtained, which helps subsequently determine the detected environment map based on the obtained object distribution information.

Anomaly recovery manner 2: The mobile robot is controlled to reset an operating system.

The controlling the mobile robot to reset an operating system is equivalent to controlling the mobile robot to restart a system (similar to restarting a computer).

Anomaly recovery manner 3: The mobile robot is controlled to restart a sensor of the mobile robot.

The controlling the mobile robot to restart a sensor of the mobile robot may be specifically controlling the mobile robot to disable a port of the sensor and then re-enable the port of the sensor.

The sensor of the mobile robot may include a laser radar, an encoder, a gyroscope, an ultrasonic sensor, an infrared sensor, and the like.

After step 2006, the method shown in FIG. 6 may further include step 2007. Step 2007 is performed to clear inaccurate object distribution information.

2007. Control the mobile robot to clear the current object distribution information.

After step 2007, step 2002 may further continue to be performed to obtain the current object distribution information.

The mobile robot is controlled to clear the current object distribution information, so that obtained object distribution information that may be not accurate enough due to a localization anomaly or a sensor fault can be cleared, and accuracy of the object distribution information obtained by the mobile robot can be ensured as far as possible.

The process shown in FIG. 7 may occur in a process of obtaining the object distribution information by the mobile robot. The process shown in FIG. 7 can be used to eliminate a difference between obtained object distribution information due to a localization anomaly, so that the obtained detected environment map can be as accurate as possible.

In this application, when a difference between the detected environment map that is detected by the mobile robot and the environment layout map is large, a return operation may be performed to re-perform a detection operation, to ensure accuracy of the detected environment map as far as possible.

Optionally, coordinate values of grid points in the M detected environment maps all are coordinate values in a same coordinate system.

When the M detected environment maps are maps located in a same coordinate system, the M detected environment maps can be merged to obtain a more precise environment layout map.

Optionally, the coordinate values of the grid points in the M detected environment maps are coordinate values in a reference coordinate system, and an origin of the reference coordinate system is at any one of the following locations:

a location at which the mobile robot stops after ending a task;

a location of a charging station of the mobile robot; or a location of a waste transfer station that goes with the mobile robot.

For example, as shown in FIG. 1, a charging station is near the vacuum cleaning robot, and a location of the charging station may be selected as the origin of the reference coordinate system.

When the M detected environment maps are obtained, the M detected environment maps may be directly disposed in the reference coordinate system in a process of obtaining the M detected environment maps. In this way, the coordinate values of the grid points in the M detected environment maps all are coordinate values in a same coordinate system (the reference coordinate system).

In addition, when the M detected environment maps are obtained, for each detected environment map, the detected environment map may be disposed in a coordinate system that uses a start point at which a corresponding working task starts to be executed as a coordinate origin, and the M detected environment maps are subsequently converted into a same coordinate system (the reference coordinate system).

Optionally, obtaining M detected environment maps includes: obtaining a first detected environment map in the M detected environment maps, where a coordinate value of a grid point in the first detected environment map is a coordinate value in a first coordinate system; and converting the coordinate value of the grid point in the first detected environment map into the coordinate value in the reference coordinate system.

The first detected environment map may be any of the M detected environment maps. The first detected environment map may be determined based on object distribution information detected when the mobile robot executes an $i^{th}$ ($1 \le i \le M$, and i is an integer) working task. An origin of the first coordinate system may be determined based on a start location at which the mobile robot executes the $i^{th}$ task.

Specifically, the coordinate origin of the first coordinate system may be a start point at which the mobile robot executes the $i^{th}$ task (for example, may be a central point of the start location at which the mobile robot executes the $i^{th}$ task).

In this application, a working map of a mobile robot may be updated through interaction between a control apparatus and the mobile robot, or the mobile robot may separately update the working map. These implementations are described below in detail.

Figure 8:
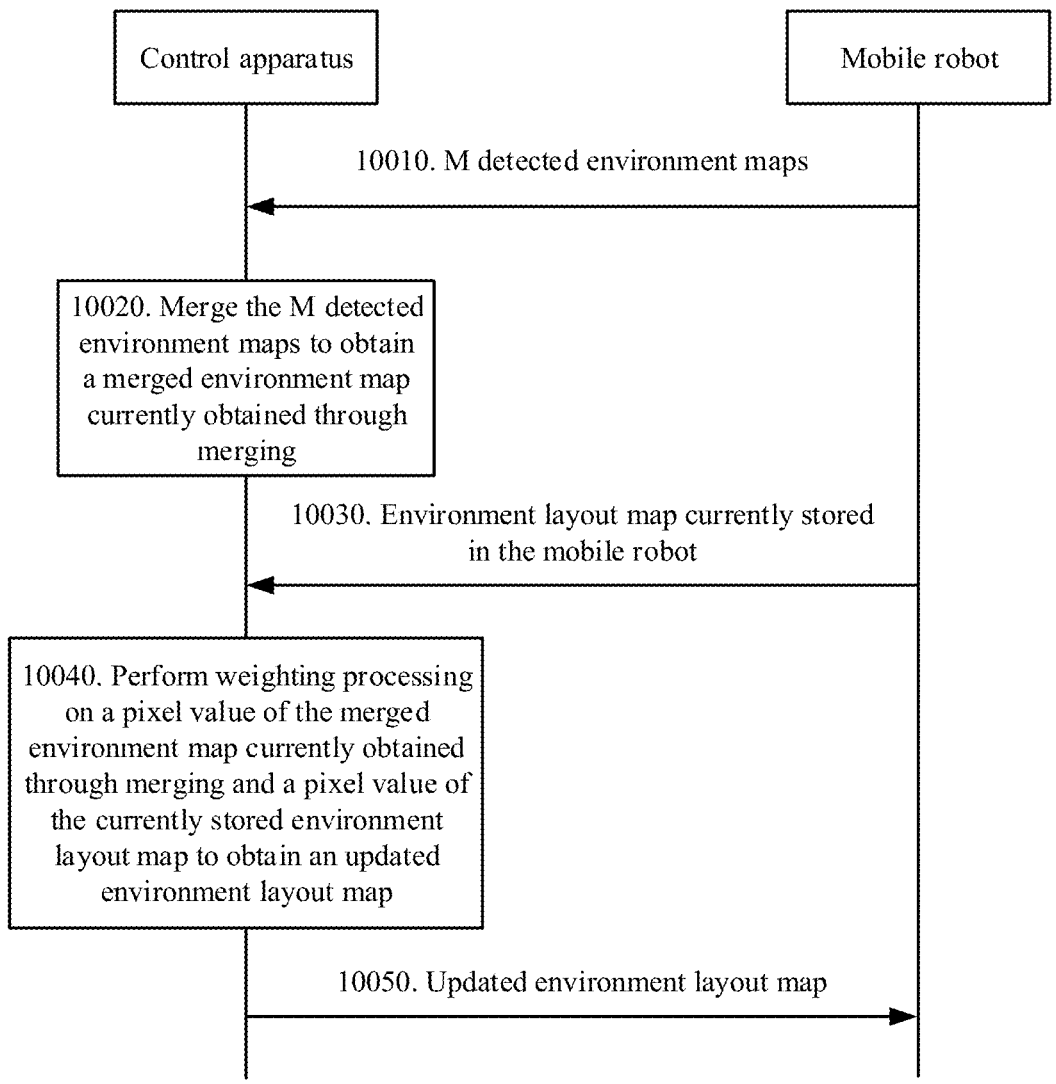
FIG. 8 is a schematic diagram of a method for updating a working map of a mobile robot according to an embodiment of this application.

FIG. 8 is a schematic diagram of a method for updating a working map of a mobile robot according to an embodiment of this application.

The method shown in FIG. 8 may be jointly performed by a control apparatus and a mobile robot. The method shown in FIG. 8 includes steps 10010 to 10050. These steps are separately described below in detail.

10010. The control apparatus obtains M detected environment maps from the mobile robot.

In step 10010, the mobile robot may send the M detected environment maps to the control apparatus, and the control apparatus receives the M detected environment maps.

It should be understood that in step 10010, the control apparatus may obtain the M detected environment maps from the mobile robot at one time (the mobile robot sends the M detected environment maps) after the mobile robot generates the M detected environment maps, or the control apparatus may obtain one detected environment map from the mobile robot each time the mobile robot generates the detected environment map (the mobile robot sends one detected environment map each time generating the detected environment map).

10020. The control apparatus merges the M detected environment maps to obtain a merged environment map currently obtained through merging.

In step 10020, when the control apparatus merges the M detected environment maps (specifically, the control apparatus may superpose the M detected environment maps) to obtain the merged environment map, the control apparatus may directly merge the M detected environment maps; or the control apparatus may merge the M detected environment maps after performing specific preprocessing (for example, filtering processing or noise reduction processing) on the M detected environment maps; or the control apparatus may perform specific selection on the M detected environment maps, and then merge selected detected environment maps.

Optionally, step 10020 specifically includes: performing filtering processing on the M detected environment maps to obtain M detected environment maps obtained after filtering processing; and merging the M detected environment maps obtained after filtering processing to obtain the merged environment map.

Filtering processing is performed on the detected environment map, so that interference of a small object in an environment can be removed, thereby providing a main layout of the environment. When filtering processing is performed on the detected environment map, morphological filtering may be specifically used to extract a line feature of the detected environment map.

10030. The control apparatus obtains, from the mobile robot, an environment layout map currently stored in the mobile robot.

In step 10030, the mobile robot may send the currently stored environment layout map to the control apparatus, and the control apparatus receives the environment layout map currently stored in the mobile robot.

10040. The control apparatus performs weighting processing on a pixel value of the merged environment map currently obtained through merging and a pixel value of the currently stored environment layout map to obtain an updated environment layout map.

A specific process of obtaining the updated environment layout map in step 10040 may be the same as a specific process of obtaining the updated environment layout map in step 1003 in the foregoing description. Details are not described herein again.

10050. The control apparatus sends the updated environment layout map to the mobile robot.

In this application, a plurality of detected maps obtained by the mobile robot during working are obtained from the mobile robot to update the environment layout map currently stored in the mobile robot, so that the updated environment layout map can reflect a more detailed environment layout. This helps the mobile robot subsequently better execute a working task based on the updated environment layout map.

After receiving the updated environment layout map, the mobile robot may execute a task based on the updated environment layout map. The environment layout map is updated in the foregoing process, so that the updated environment layout map is more accurate, and the mobile robot can subsequently better work based on the updated environment layout map.

In this application, when the object distribution information obtained by the mobile robot is not accurate enough due to a sensor fault (for example, a sensor localization fault), the control apparatus may be used to control the mobile robot to recover from an anomaly, so that the obtained object distribution information has high accuracy. An anomaly recovery process in the method in this application is described below with reference to FIG. 9.

Figure 9:
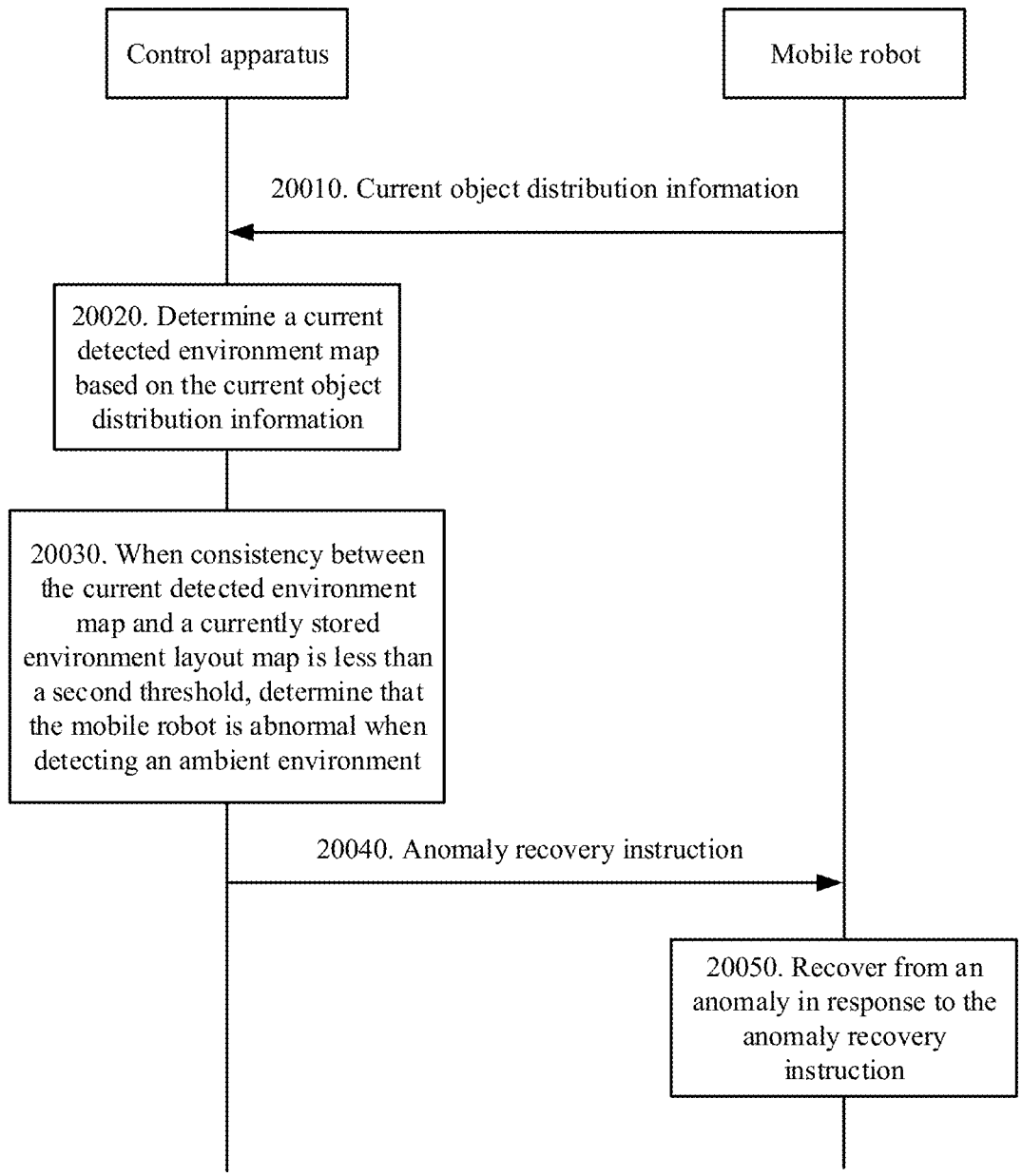
FIG. 9 is a schematic diagram of an anomaly recovery process in a method for updating a working map of a mobile robot according to an embodiment of this application.

FIG. 9 is a schematic diagram of an anomaly recovery process in a method for updating a working map of a mobile robot according to an embodiment of this application.

The anomaly recovery process shown in FIG. 9 includes step 20010 to step 20050. These steps are described below in detail.

20010. A control apparatus obtains current object distribution information from a mobile robot.

The current object distribution information is object distribution information detected by the mobile robot in a preset interval or a preset distance, the preset interval is a time interval before the mobile robot reaches a current detection point, and the preset distance is a distance by which the mobile robot moves before the mobile robot reaches the current detection point.

In step 20010, the mobile robot may send the current object distribution information to the control apparatus. After receiving the current object distribution information, the control apparatus may perform step 20020.

The mobile robot may periodically send the current object distribution information to the control apparatus.

20020. The control apparatus determines a current detected environment map based on the current object distribution information.

20030. When consistency between the current detected environment map and a currently stored environment layout map is less than a second threshold, the control apparatus determines that the mobile robot is abnormal when detecting an ambient environment.

20040. The control apparatus sends an anomaly recovery instruction to the mobile robot.

20050. The mobile robot recovers from an anomaly in response to the anomaly recovery instruction.

The anomaly recovery instruction is used to instruct the mobile robot to recover from an anomaly. After receiving the anomaly recovery instruction, the mobile robot recovers from the anomaly in response to the anomaly recovery instruction.

The anomaly recovery instruction may include a plurality of specific operation instructions, for example, a return instruction, a re-detection instruction, and a restart instruction.

Optionally, the control apparatus sends a return instruction to the mobile robot.

The return instruction is used to instruct the mobile robot to return from the current detection point to a first detection point, and a distance between the first detection point and the current detection point is the preset distance. After receiving the return instruction, the mobile robot returns from the current detection point to the first detection point in response to the return instruction.

Optionally, the control apparatus sends a re-detection instruction to the mobile robot.

The re-detection instruction is used to instruct the mobile robot to start to re-detect the ambient environment from the first detection point, to obtain new object distribution information. After receiving the re-detection instruction, the mobile robot starts to re-detect the ambient environment from the first detection point in response to the re-detection instruction, to obtain new object distribution information.

Optionally, the control apparatus sends a restart instruction to the mobile robot.

The restart instruction is used to instruct the mobile robot to restart, and re-detect the ambient environment after restarts. After the mobile robot receives the restart instruction, the mobile robot restarts in response to the restart instruction, and re-detects the ambient environment after the restart.

The restart instruction may not only instruct the mobile robot to reset an operating system, but also instruct the mobile robot to restart a corresponding sensor.

Restarting the operating system is similar to restarting a computer system, and restarting the sensor may be specifically disabling a port of the sensor and then re-enabling the port of the sensor.

The sensor of the mobile robot may include a laser radar, an encoder, a gyroscope, an ultrasonic sensor, an infrared sensor, and the like.

Optionally, the control apparatus sends a clear instruction to the mobile robot.

The clear instruction is used to clear the current object distribution information. After receiving the clear instruction, the mobile robot clears the current object distribution information in response to the clear instruction.

The mobile robot is controlled to clear the current object distribution information, so that obtained object distribution information that may be not accurate enough due to a localization anomaly or a sensor fault can be cleared, and accuracy of the object distribution information obtained by the mobile robot can be ensured as far as possible.

It should be understood that content described about anomaly recovery in the foregoing description when the method shown in FIG. 1 is described is also applicable to the anomaly recovery process shown in FIG. 9. To avoid unnecessary repetition, details are not described herein again.

In this application, the mobile robot may update a map, and this case is described below in detail with reference to FIG. 10.

Figure 10:
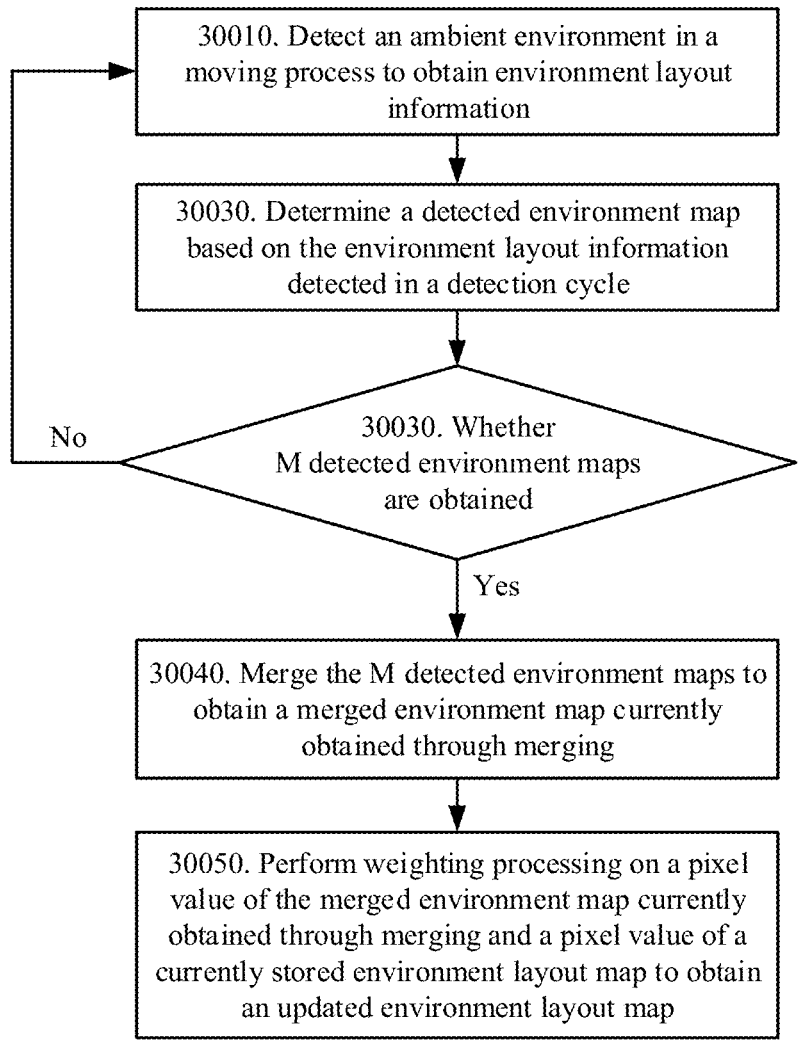
FIG. 10 is a schematic flowchart of a method for updating a working map of a mobile robot according to an embodiment of this application.

FIG. 10 is a schematic flowchart of a method for updating a working map of a mobile robot according to an embodiment of this application.

The method shown in FIG. 10 may be performed by a mobile robot. The method shown in FIG. 10 includes steps 30010 to 30050. These steps are described below in detail.

30010. Detect an ambient environment in a moving process to obtain environment layout information.

30020. Determine a detected environment map based on the environment layout information detected in a detection cycle.

The first detection cycle may correspond to time of one working cycle, and one working cycle may mean that the mobile robot completes one working task.

30030. Determine whether M detected environment maps are obtained.

The M detected environment maps are determined based on object distribution information detected by the mobile robot in the moving process, and M is an integer greater than 1.

30040. Merge the M detected environment maps to obtain a merged environment map currently obtained through merging.

30050. Perform weighting processing on a pixel value of the merged environment map currently obtained through merging and a pixel value of a currently stored environment layout map to obtain an updated environment layout map.

The currently stored environment layout map is obtained by performing weighting processing on a merged environment map obtained the last time through merging and an environment layout map stored the last time, and the merged environment map obtained through merging the last time is obtained through merging based on M detected environment maps obtained the last time.

In this application, a plurality of detected maps obtained by the mobile robot during working are obtained to update the environment layout map currently stored in the mobile robot, so that the updated environment layout map can reflect a more detailed environment layout. This helps the mobile robot subsequently better execute a working task based on the updated environment layout map.

The method shown in FIG. 10 is similar to the foregoing process of the method shown in FIG. 2. The method shown in FIG. 2 may be performed by the control apparatus of the mobile robot, and the method shown in FIG. 10 may be performed by the mobile robot. Content for extending, explaining, and describing map merging and updating in the method shown in FIG. 2 is also applicable to the method shown in FIG. 10. To avoid unnecessary repetition, details are not described herein again.

To better understand the solutions in the embodiments of this application, a specific process of the method for updating the working map of the mobile robot in the embodiments of this application is described below with reference to FIG. 11.

Figure 11:
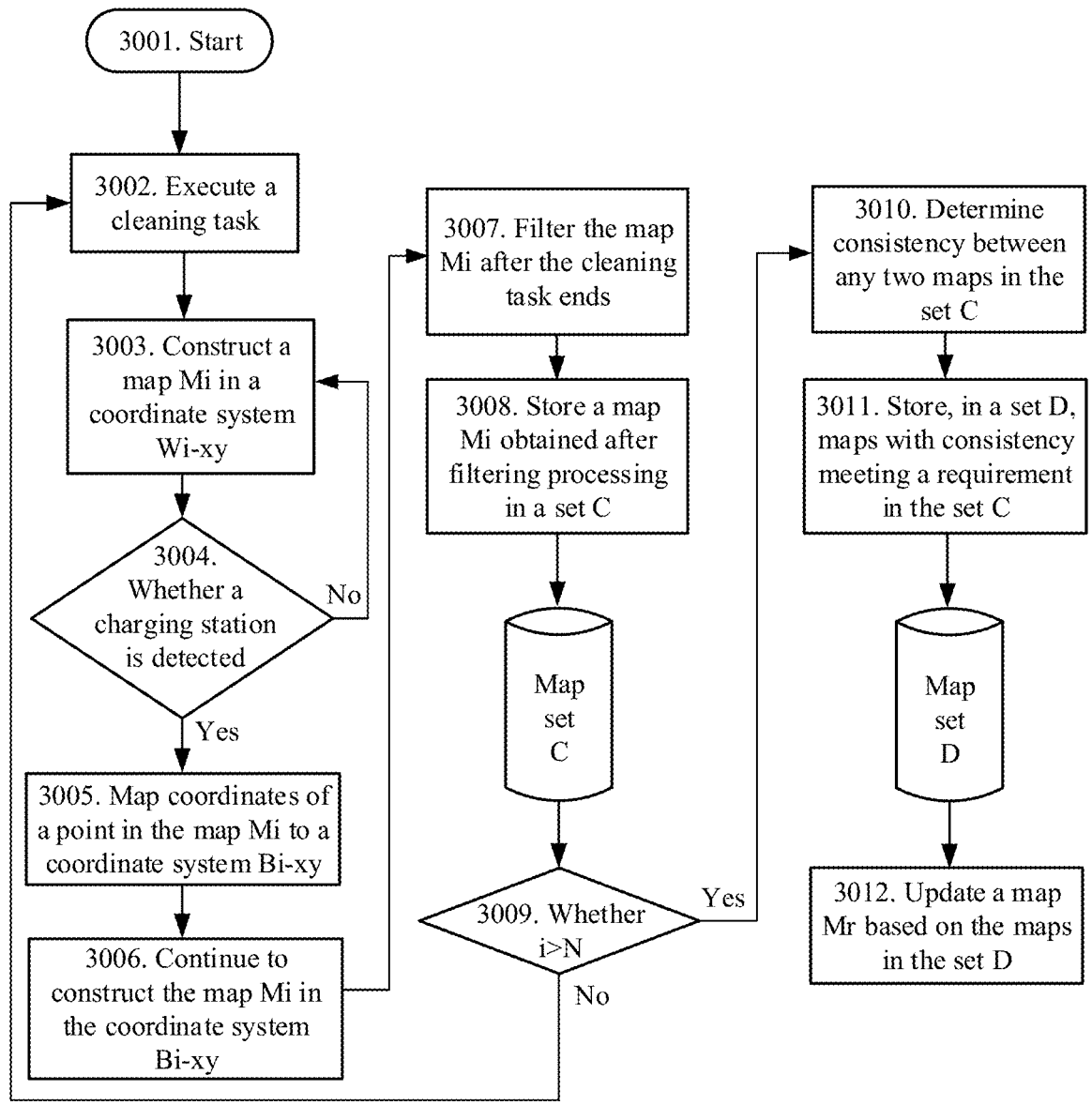
FIG. 11 is a schematic diagram of a process of updating a working map by a vacuum cleaning robot in a process of executing a cleaning task.

FIG. 11 shows a process of updating a working map by a vacuum cleaning robot in a process of executing a cleaning task.

3001. Start.

Step 3001 indicates that a cleaning task starts.

In step 3001, when the vacuum cleaning robot starts to execute the cleaning task, the vacuum cleaning robot is in an initial state. When the vacuum cleaning robot is in the initial state, a quantity of times of executing the cleaning task is zero, and both a set C and a set D are empty. The set C is used to store a detected environment map obtained by the vacuum cleaning robot, and the set D is used to store a detected environment map that used to update an environment layout map.

3002. Execute the cleaning task.

It should be understood that in the process of executing the cleaning task by the vacuum cleaning robot, the vacuum cleaning robot needs to detect surrounding objects to obtain object distribution information of the surrounding objects.

3003. Construct a map Mi in a coordinate system Wi-xy.

The coordinate system Wi-xy may be a coordinate system that uses a start point at which an $i^{th}$ cleaning task is executed as a coordinate origin, and the map Mi is a detected environment map determined based on object distribution information obtained during execution of the $i^{th}$ cleaning task.

3004. Determine whether a charging station is detected.

When the charging station is not detected, step 3003 continues to be performed; or when the charging station is detected, step 3005 is performed.

3005. Map coordinates of the map Mi to a coordinate system Bi-xy.

The coordinate system Bi-xy is a coordinate system that uses a location of the charging station as a coordinate origin, and the coordinate system may be referred to as a reference coordinate system or a standard coordinate system.

In addition to being the coordinate system that uses the location of the charging station as the coordinate origin, the coordinate system Bi-xy may be a coordinate system that uses any one of the following locations as a reference origin: a location at which the vacuum cleaning robot stops after ending a task, and a location of a waste transfer station that goes with the vacuum cleaning robot.

The map Mi obtained in step 3003 is located in the coordinate system Wi-xy. In step 3005, the coordinates of the map Mi are converted from the coordinate system Wi-xy into the coordinate system Bi-xy.

Step 3005 is equivalent to converting the initially constructed map Mi into a same coordinate system.

Specifically, a coordinate value of the map Mi in the coordinate system Wi-xy may be converted into a coordinate value of the map Mi in the coordinate system Bi-xy according to formula (7).

$$O_i^B = {}_w^B T * O_i^W \quad (7)$$

In formula (7), $O_i^W$ represents a coordinate value of any point in the map Mi in the coordinate system Wi-xy, $O_i^B$ represents a coordinate value of any point in the map Mi in the coordinate system Bi-xy, ${}_w^B T$ represents a conversion coefficient or a conversion factor, and ${}_w^B T$ may be calculated according to formula (8).

$$_w^B T = \begin{bmatrix} \cos\theta & \sin\theta & -B_{ix}^W \\ -\sin\theta & \cos\theta & -B_{iy}^W \\ 0 & 0 & 1 \end{bmatrix} \quad (8)$$

In the formula, $(-B_{ix}^W, -B_{iy}^W)$ represents a coordinate value of the charging station (the location of the charging station is selected herein as the origin of Bi-xy) in the coordinate system Wi-xy, and $\theta$ is a posture angle of the charging station.

3006. Continue to construct the map Mi in the coordinate system Bi-xy.

3007. Perform filtering processing on the map Mi when the cleaning task ends.

3008. Store a map Mi obtained after filtering processing in the set C.

3009. Determine whether a quantity i of times of performing cleaning by the vacuum cleaning robot is greater than N.

When the quantity i of times of performing cleaning by the vacuum cleaning robot is less than or equal to N, step 3002 continues to be performed to continue to obtain a map. Alternatively, when the quantity i of times of performing cleaning by the vacuum cleaning robot is greater than N, step 3010 is performed.

3010. Determine consistency between any two maps in the set C.

3011. Store, in the set D, maps with better consistency in the set C.

In step 3011, consistency between two maps may be determined by using the formulas (1) and (2) in the foregoing description, and maps with consistency greater than a preset threshold are stored in the set D. A specific process is not described in detail herein.

3012. Update a map Mr based on the maps in the set D.

Specifically, in step 3012, a merged environment map may be first obtained based on the maps in the set D, and then an environment layout map Mr is updated by using the merged environment map to obtain an updated environment layout map Mr.

Further, in step 3012, before the merged environment map is obtained, an abnormal detected environment map in the set D may be first eliminated to obtain an environment layout map update set Ds, and the merged environment map is determined by using detected environment maps in the set Ds.

It should be understood that the set C and the set D in the method shown in FIG. 11 may have same meanings as the set C and the set D in the foregoing description.

The method for updating a working map of a mobile robot in the embodiments of this application is described above with reference to the accompanying drawings. A related apparatus for updating a working map of a mobile robot in the embodiments of this application is described below with reference to FIG. 12 to FIG. 17. It should be understood that the apparatus shown in FIG. 12 to FIG. 17 can perform steps of the method for updating the working map of the mobile robot in the embodiments of this application. To avoid unnecessary repetition, the following appropriately omits repeated descriptions when describing the apparatus in the embodiments of this application.

Figure 12:
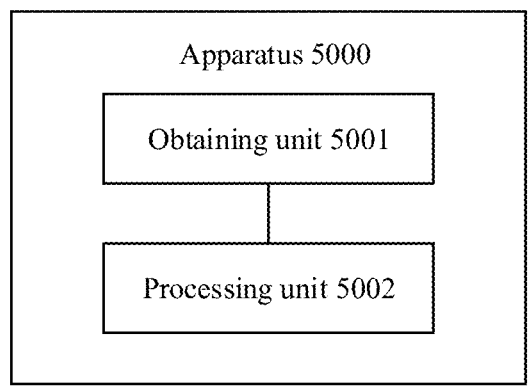
FIG. 12 is a schematic block diagram of an apparatus for updating a working map of a mobile robot according to an embodiment of this application.

FIG. 12 is a schematic block diagram of an apparatus for updating a working map of a mobile robot according to an embodiment of this application.

An apparatus 5000 shown in FIG. 12 includes an obtaining unit 5001 and a processing unit 5002.

The apparatus 5000 shown in FIG. 12 is configured to perform the method for updating the working map of the mobile robot in the embodiments of this application. Specifically, the obtaining unit 5001 in the apparatus 5000 may be configured to obtain M detected environment maps, and the processing unit 5002 is configured to finally obtain an updated environment layout map based on the M detected environment maps obtained by the obtaining unit 5001.

In this application, the processing unit 5002 may not only finally obtain the updated environment layout map based on the obtained M detected environment maps, but also control a mobile robot. In other words, the processing unit 5002 herein may not only have a data processing function, but also have a function of controlling the mobile robot.

Figure 13:
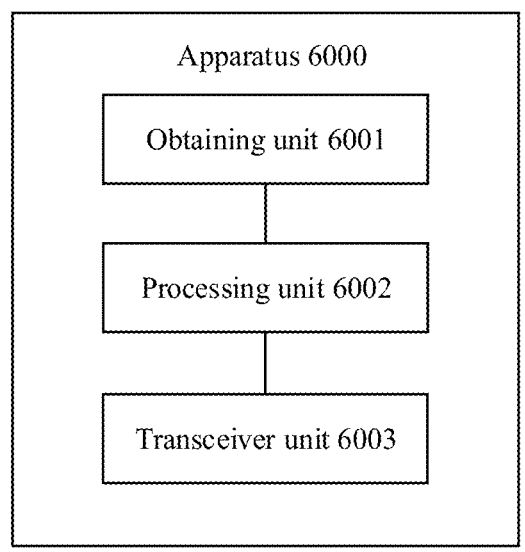
FIG. 13 is a schematic block diagram of an apparatus for updating a working map of a mobile robot according to an embodiment of this application.

FIG. 13 is a schematic block diagram of an apparatus for updating a working map of a mobile robot according to an embodiment of this application.

An apparatus 6000 shown in FIG. 13 includes an obtaining unit 6001, a processing unit 6002, and a transceiver unit 6003.

The obtaining unit 6001 in the apparatus 6000 may be configured to obtain M detected environment maps from a mobile robot. The processing unit 6002 is configured to finally obtain an updated environment layout map based on the M detected environment maps obtained by the obtaining unit 5001. The transceiver unit 6003 is configured to send the updated environment layout map to the mobile robot.

The apparatus 6000 shown in FIG. 13 may be equivalent to the control apparatus in FIG. 8 and FIG. 9, and the apparatus 6000 may perform steps performed by the control apparatus in FIG. 8 and FIG. 9.

Figure 14:
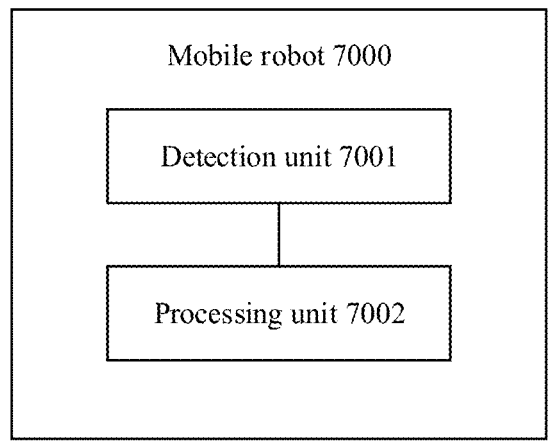
FIG. 14 is a schematic block diagram of a mobile robot according to an embodiment of this application.

FIG. 14 is a schematic block diagram of a mobile robot according to an embodiment of this application.

A mobile robot 7000 shown in FIG. 14 includes a detection unit 7001 and a processing unit 7002.

The detection unit 7001 in the mobile robot 7000 is configured to detect an ambient environment in a moving process to obtain environment layout information. The processing unit 7002 is configured to process the environment layout information obtained by the detection unit 7001 to finally obtain an updated environment layout map.

The mobile robot 7000 shown in FIG. 14 may perform steps 30010 to 30050 in the method shown in FIG. 10.

Figure 15:
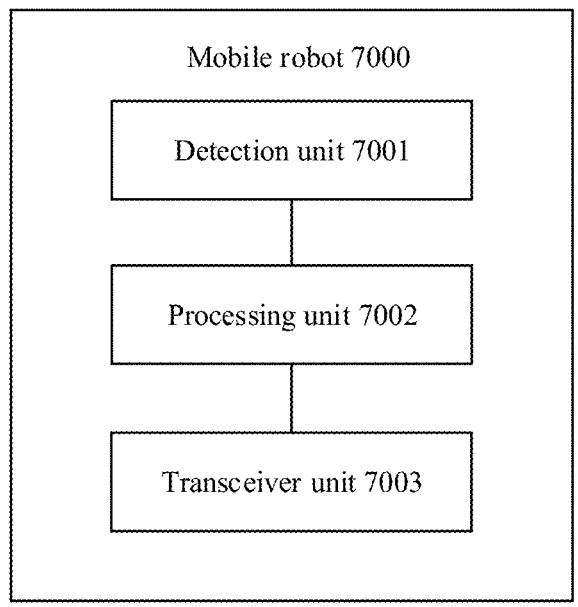
FIG. 15 is a schematic block diagram of a mobile robot according to an embodiment of this application.

Further, as shown in FIG. 15, the mobile robot 7000 may include a transceiver unit.

FIG. 15 is a schematic block diagram of a mobile robot according to an embodiment of this application.

In addition to including the detection unit 7001 and the processing unit 7002 shown in FIG. 14, the mobile robot 7000 shown in FIG. 15 further includes a transceiver unit 7003.

The detection unit 7001 is configured to detect an ambient environment to obtain environment layout information. The processing unit 7002 is configured to determine a detected environment map based on the environment layout information detected by the detection unit 7001 in one detection cycle. The transceiver unit 7003 is configured to send M detected environment maps to a control apparatus. The transceiver unit 7003 may further receive an updated environment layout map from the control apparatus.

The mobile robot 7000 shown in FIG. 15 may be equivalent to the mobile robot in FIG. 8 and FIG. 9, and the mobile robot 7000 may perform steps performed by the mobile robot in FIG. 8 and FIG. 9.

Figure 16:
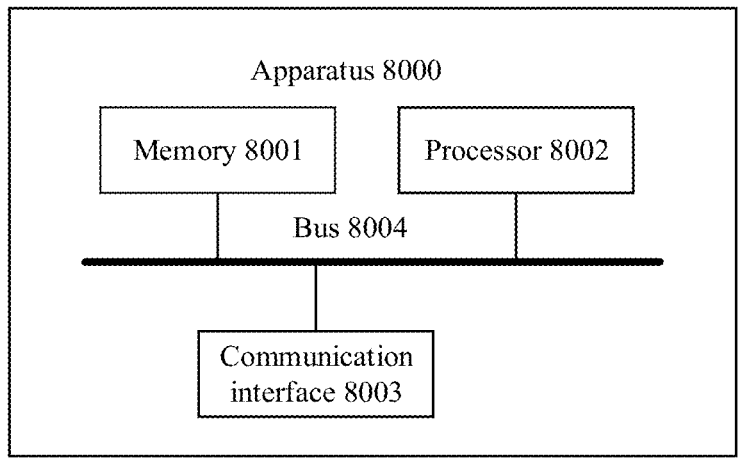
FIG. 16 is a schematic block diagram of an apparatus for updating a working map of a mobile robot according to an embodiment of this application.

FIG. 16 is a schematic diagram of a hardware structure of an apparatus for updating a working map of a mobile robot according to an embodiment of this application. The apparatus 8000 shown in FIG. 16 includes a memory 8001, a processor 8002, a communication interface 8003, and a bus 8004. Communication connections between the memory 8001, the processor 8002, and the communication interface 8003 are implemented through the bus 8004.

The apparatus 8000 may be a control apparatus controlling a mobile robot, or may be a mobile robot.

A processor 8002 in the apparatus 8000 may not only obtain corresponding data and process the corresponding data (for example, obtain the M detected environment maps, and finally obtain an updated environment layout map based on the M detected environment maps), but also control a mobile robot (for example, control the mobile robot to perform a return operation, and control the mobile robot to clear current object distribution information).

The memory 8001 may be a read-only memory (ROM), a static storage device, a dynamic storage device, or a random access memory (RAM). The memory 8001 may store a program. When the program stored in the memory 8001 is executed by the processor 8002, the processor 8002 is configured to perform steps of the method for updating the working map of the mobile robot in the embodiments of this application.

The processor 8002 may use a general-purpose central processing unit (CPU), a microprocessor, an application-specific integrated circuit (ASIC), a graphics processing unit (GPU), or one or more integrated circuits, and is configured to execute a related program, to implement the method for updating the working map of the mobile robot in the method embodiments of this application.

Alternatively, the processor 8002 may be an integrated circuit chip and has a signal processing capability. In an implementation process, steps of the method for updating the working map of the mobile robot in this application may be completed by using an integrated logic circuit of hardware in the processor 8002 or by using instructions in a form of software.

The foregoing processor 8002 may alternatively be a general-purpose processor, a digital signal processor (DSP), an ASIC, a field programmable gate array (FPGA) or another programmable logic device, a discrete gate or transistor logic device, or a discrete hardware component. The methods, the steps, and logic block diagrams that are disclosed in the embodiments of this application may be implemented or performed. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory 8001. The processor 8002 reads information in the memory 8001, and completes, in combination with hardware of the processor 8002, a function that needs to be performed by a unit included in the apparatus; or performs the method for updating the working map of the mobile robot in the method embodiment of this application.

The communication interface 8003 uses a transceiver apparatus, for example, but not limited to, a transceiver, to implement communication between the apparatus 8000 and another device or communication network. For example, information about a to-be-established neural network and training data required in a process of establishing a neural network may be obtained through the communication interface 8003.

The bus 8004 may include a path for information transmission between the components (for example, the memory 8001, the processor 8002, and the communication interface 8003) of the apparatus 8000.

The obtaining unit 5001 and the processing unit 5002 in the apparatus 5000 are equivalent to the processor 8002 in the apparatus 8000.

The obtaining unit 6001 and the processing unit 6002 in the apparatus 6000 are equivalent to the processor 8002 in the apparatus 8000, and the transceiver unit 6003 is equivalent to the communication interface 8003 in the apparatus 8000.

The detection unit 7001 and the processing unit 7002 in the apparatus 7000 shown in FIG. 14 or FIG. 15 are equivalent to the processor 8002 in the apparatus 8000, and the transceiver unit 7003 in the apparatus 7000 shown in FIG. 15 is equivalent to the communication interface 8003 in the apparatus 8000.

Figure 17:
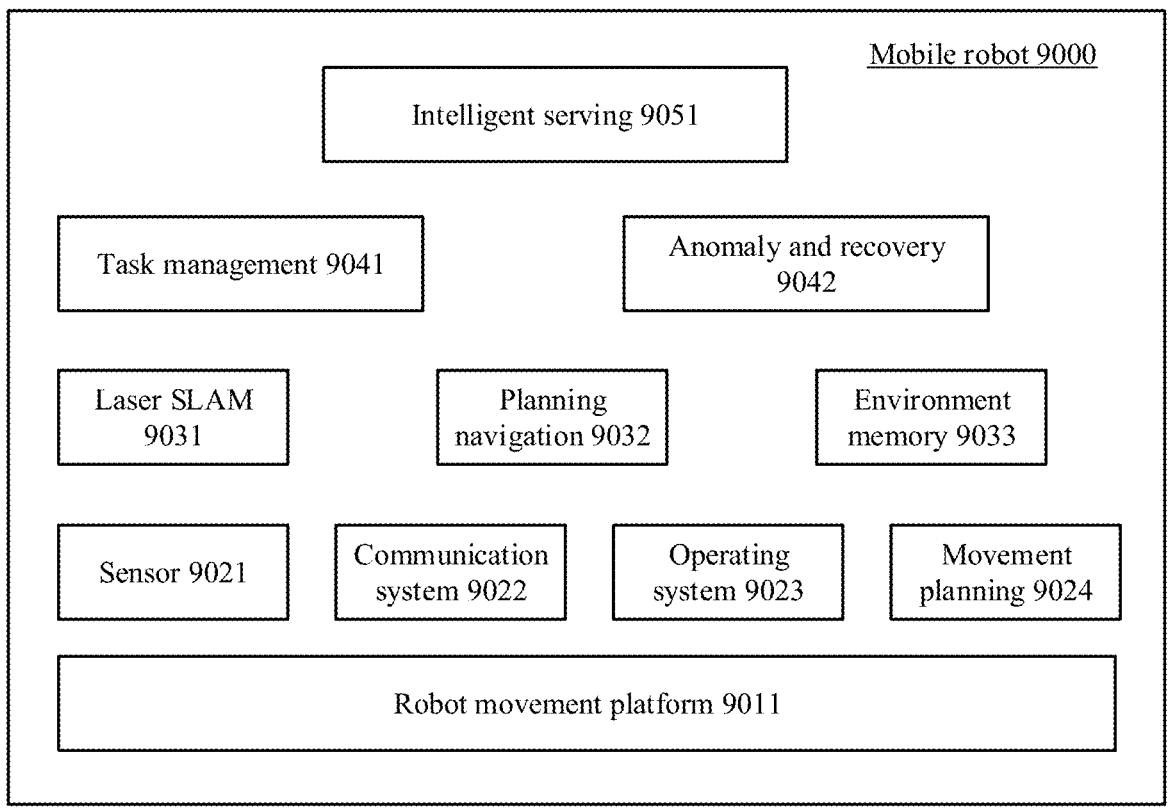
FIG. 17 is a schematic block diagram of a mobile robot according to an embodiment of this application.

FIG. 17 is a schematic block diagram of a mobile robot according to an embodiment of this application.

A mobile robot 9000 shown in FIG. 17 includes many function modules. These function modules may be divided into different layers based on a mutual support relationship. A lower-layer module supports a function of an upper-layer module.

The mobile robot 9000 specifically includes a robot movement platform 9011, a sensor 9021, a communication system 9022, an operating system 9023, movement planning module 9024, laser SLAM module 9031, planning navigation module 9032, an environment memory module 9033, task management module 9041, anomaly detection and recovery module 9042, and intelligent serving module 9051. The modules or units are briefly described below.

The robot movement platform 9011 includes hardware units such as a robot chassis, a motor driving unit, a power management unit, and a master control unit. The robot movement platform 9011 may control movement of a robot based on a specific instruction. For example, in this application, when a mobile robot needs to return from a current detection point to a first detection point, the robot movement platform may be used to control the mobile robot to move from the current detection point to the first detection point.

The sensor 9021 may specifically include a laser radar, an encoder, a gyroscope, an inertial measurement unit (IMU), an ultrasonic sensor, an infrared sensor, and the like. In this application, the sensor 9021 may detect a surrounding object to obtain object distribution information.

The communication system 9022 may perform communication through serial communication, Ethernet communication, or a CAN bus system. In this application, the mobile robot may communicate, by using the communication system 9022, with a control apparatus controlling the mobile robot. For example, the mobile robot may send the detected object distribution information to the control apparatus by using the communication system 9022, and the control apparatus may send an updated environment layout map to the mobile robot by using the communication system 9022.

The communication system 9022 may be equivalent to the communication interface 8003 in the apparatus 8000.

The operating system 9023 may be a Linux system.

Movement planning module 9024 can plan a walking path of a robot.

Laser SLAM module 9031 is an algorithm module that mainly uses a laser to implement synchronous mapping and localization. A map format generated by laser SLAM module 9031 is a grid map. In this application, laser SLAM module 9031 may generate a detected environment map based on the detect object distribution information.

Planning navigation module 9032 is responsible for completing autonomous movement and obstacle avoidance of a robot, and also includes a function such as full coverage required by another serving task.

The environment memory module 9033 may be configured to store an environment layout map obtained by a robot. For example, in this application, the environment memory module 9033 may store the environment layout map, and update the original environment layout map after obtaining the updated environment layout map.

Task management module 9041 mainly completes robot status management, user instruction interaction, and working task management.

Anomaly detection and recovery module 9042 is configured to recover from an anomaly when a robot is abnormal. In this application, when a difference between a current detected environment map and an environment layout map is large, anomaly detection and recovery module 9042 can control the mobile robot to return from the current detection point to the first detection point, and control the mobile robot to restart to perform detection from the first detection point.

On the basis of the foregoing main modules, intelligent serving module 9051 may autonomously and intelligently complete a home or customer serving task.

Intelligent serving module 9051 may include an interface for interacting with a user. Through the interface, the user can flexibly set a task, adjust a related parameter of an executed task, and so on.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the embodiments provided in this application, it should be understood that the disclosed system, apparatus, and method may be implemented in other manners. For example, the described apparatus embodiments are merely examples. For example, division into the units is merely logical function division, or may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and components displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for controlling a mobile robot, comprising:
    obtaining M detected environment maps, wherein the M detected environment maps are determined based on object distribution information detected by the mobile robot in a moving process, and M is an integer greater than 1;
    merging the M detected environment maps to obtain a merged environment map;
    performing weighting processing on a pixel value of the merged environment map and a pixel value of a currently stored environment layout map to obtain an updated environment layout map, wherein the currently stored environment layout map is obtained by performing weighting processing on a previously merged environment map and a previously stored environment layout map and controlling the mobile robot around a workplace using the updated environment layout map.

2. The method according to claim 1, wherein when weighting processing is performed on the pixel value of the merged environment map and the pixel value of the currently stored environment layout map, a weight corresponding to the pixel value of the merged environment map and a weight corresponding to the pixel value of the currently stored environment layout map are respectively a first weight and a second weight, and values of the first weight and the second weight are determined based on a map update requirement of the mobile robot in operation.

3. The method according to claim 2, wherein determining that the values of the first weight and the second weight based on the map update requirement of the mobile robot comprises:
    the first weight is in a positive correlation with an environment layout map update frequency required when the mobile robot operates, and the second weight is in a negative correlation with the environment layout map update frequency required when the mobile robot operates.

4. The method according to claim 1 wherein merging the M detected environment maps to obtain the merged environment map comprises:
    determining N detected environment maps from the M detected environment maps, wherein consistency between any two of the N detected environment maps is greater than or equal to a first threshold, and N is a positive integer less than or equal to M; and
    merging the N detected environment maps to obtain the merged environment map.

5. The method according to claim 1, wherein the method further comprises:
    determining a current detected environment map based on current object distribution information, wherein the current object distribution information is object distribution information detected by the mobile robot in a preset interval or a preset distance, the preset interval being a time interval before the mobile robot reaches a current detection point, and the preset distance being a distance by which the mobile robot moves before the mobile robot reaches the current detection point;
    when consistency between the current detected environment map and the environment layout map is less than a second threshold, determining that the mobile robot is abnormal when detecting an ambient environment; and
    controlling the mobile robot to recover from an anomaly.

6. The method according to claim 5, wherein controlling the mobile robot to recover from the anomaly comprises:
    controlling the mobile robot to return from the current detection point to a first detection point, wherein a distance between the first detection point and the current detection point is the preset distance; and
    controlling the mobile robot to start to re-detect the ambient environment from the first detection point, to obtain new object distribution information.

7. The method according to claim 5, wherein the method further comprises:
    controlling the mobile robot to clear the current object distribution information.

8. The method according to claim 1, wherein the M detected environment maps all are located in a same coordinate system.

9. The method according to claim 8, wherein the M detected environment maps all are located in a reference coordinate system, and an origin of the reference coordinate system is at any one of the following locations:
    a location of a charging station of the mobile robot;
    a location at which the mobile robot stops after ending a task; or
    a location of a waste transfer station that goes with the mobile robot.

10. The method according to claim 1, wherein the M detected environment maps are determined based on object distribution information detected when the mobile robot executes a working task in the workplace.

11. The method according to claim 10, wherein the M detected environment maps are respectively determined based on M pieces of object distribution information, and the M pieces of object distribution information are respectively object distribution information detected when the mobile robot executes M working tasks.

12. A mobile robot, comprising:
a memory, configured to store a program; and
a processor, configured to execute the program stored in the memory, wherein when the program stored in the memory is executed, the processor is configured to perform the method according to claim 1.

13. A computer storage medium, wherein the computer storage medium stores program code, and the program code comprises instructions used to perform the steps in the method according to claim 1.

* * * * *

UNITED STATES PATENT AND TRADEMARK OFFICE
CERTIFICATE OF CORRECTION

| | | |
|---|---|---|
| PATENT NO. | : 11,896,175 B2 | Page 1 of 1 |
| APPLICATION NO. | : 17/565640 | |
| DATED | : February 13, 2024 | |
| INVENTOR(S) | : Jingtao Xue et al. | |

It is certified that error appears in the above-identified patent and that said Letters Patent is hereby corrected as shown below:

In the Claims

In Column 37, Line 58, in Claim 1, delete "map" and insert -- map; --.

Signed and Sealed this
Seventh Day of May, 2024

Katherine Kelly Vidal
*Director of the United States Patent and Trademark Office*